United States Patent
Hayashi et al.

(10) Patent No.: US 6,511,733 B2
(45) Date of Patent: Jan. 28, 2003

(54) MAGNETIC RECORDING MEDIUM CONTAINING SPECIFIC NON-MAGNETIC COMPOSITE PARTICLES OF COATED HEMATITE PARTICLES

(75) Inventors: Kazuyuki Hayashi, Hiroshima (JP); Mamoru Kamigaki, Kure (JP); Hiroko Morii, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 135 days.

(21) Appl. No.: 09/805,374

(22) Filed: Mar. 14, 2001

(65) Prior Publication Data

US 2001/0044036 A1 Nov. 22, 2001

(30) Foreign Application Priority Data

Mar. 16, 2000 (JP) .......................................... 2000-74115

(51) Int. Cl.⁷ ................................................. B32B 5/16
(52) U.S. Cl. ....................... 428/145; 428/149; 428/327; 428/329; 428/336; 428/403; 428/405; 428/407; 428/693; 428/694 BB; 428/694 BR; 428/694 BN; 428/694 BA
(58) Field of Search ................................. 428/145, 149, 428/329, 327, 336, 403, 405, 407, 693, 694 BB, 694 BR, 694 BN, 694 BA

(56) References Cited

U.S. PATENT DOCUMENTS

| | | | | |
|---|---|---|---|---|
| 4,075,384 A | * | 2/1978 | Suzuki et al. ................ | 428/212 |
| 5,565,291 A | * | 10/1996 | Mayama et al. .......... | 430/106.6 |
| 5,686,012 A | * | 11/1997 | Hayashi et al. .......... | 252/62.56 |
| RE36,220 E | * | 6/1999 | Mori et al. .................. | 428/141 |
| 6,130,017 A | * | 10/2000 | Hayashi et al. ............. | 430/106 |
| 6,287,668 B1 | * | 9/2001 | Hayashi et al. ............. | 428/141 |
| 6,294,242 B1 | * | 9/2001 | Hayashi et al. ............. | 428/141 |
| 6,352,776 B1 | * | 3/2002 | Hayashi et al. ............. | 428/403 |
| 6,416,864 B1 | * | 7/2002 | Hayashi et al. ............. | 428/403 |
| 6,420,030 B1 | * | 7/2002 | Hayashi et al. ............. | 428/407 |

FOREIGN PATENT DOCUMENTS

| | | |
|---|---|---|
| EP | 61237225 | 10/1986 |
| EP | 0 451 703 A | 10/1991 |

\* cited by examiner

*Primary Examiner*—H. Thi Le
(74) *Attorney, Agent, or Firm*—Nixon & Vanderhye P.C.

(57) ABSTRACT

A magnetic recording medium comprises:
 a non-magnetic base film;
 a magnetic recording layer formed on one surface of the non-magnetic base film, comprising a binder resin and magnetic particles; and
 a back coat layer formed on a surface opposite of the non-magnetic base film to the surface on which the magnetic recording layer is formed, comprising a binder resin and plate-shaped non-magnetic composite particles having an average plate surface diameter of 0.1 to 5.0 μm, an average thickness of 0.001 to 0.1 μm and a plate ratio (average plate surface diameter/average thickness) of 5:1 to 100:1, wherein the plate-shaped non-magnetic composite particles comprise: plate-shaped hematite particles as core particles; a coating layer formed on surface of said plate-shaped hematite particle, comprising at least one organosilicon compound selected from the group consisting of: (1) organosilane compounds obtained from an alkoxysilane compounds, and (2) polysiloxanes or modified polysiloxanes; and a carbon black coat formed on said coating layer comprising at least one organosilicon compound, in an amount of from more than 1 to 30 parts by weight based on 100 parts by weight of said plate-shaped hematite particles.

21 Claims, No Drawings

MAGNETIC RECORDING MEDIUM CONTAINING SPECIFIC NON-MAGNETIC COMPOSITE PARTICLES OF COATED HEMATITE PARTICLES

BACKGROUND OF THE INVENTION

The present invention relates to a magnetic recording medium, and more particularly, to a magnetic recording medium which is not only excellent in running property and durability but also capable of minimizing occurrence of drop-outs, and has a low light transmittance.

With recent tendency toward long-time recording and miniaturization of video or audio magnetic recording and reproducing apparatuses, magnetic recording media such as magnetic tapes have been increasingly and strongly required to have a higher performance, namely, a higher recording density, higher output characteristic, in particular, improved frequency characteristics and a lower noise level.

In particular, video tapes have been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), ". . . the conditions for high-density recording in a coated-layer type tape are that the noise level is low with respect to signals having a short wavelength and that the high output characteristics with low noise are maintained. To satisfy these conditions, it is necessary that the tape has large coercive force Hc and residual magnetization Br, . . . and the coating film has a smaller thickness."

With the development of a thinner magnetic recording layer, a non-magnetic base film therefor such as a base film has also been required to have a small thickness from the viewpoints of miniaturization and long-time recording performance. As a result, such magnetic recording media suffer from deterioration in stiffness both in the machine direction and in the transverse direction, thereby causing problems concerning running property and durability thereof. This fact is described, for example, on page 77 of the above-described *Development of Magnetic Materials and Technique for High Dispersion of Magnetic Powder*, "Higher recording density is a large problem assigned to the present magnetic tape. This is important in order to shorten the length of the tape so as to miniaturize the size of a cassette and to enable long-time recording. For this purpose, it is necessary to reduce the thickness of a base film . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded."

Namely, the stiffness of the magnetic recording medium has a close relationship to its restraining force for inhibiting the separation of a running tape from a guide post for regulating tape positions, or its controlling force for maintaining a constant gap between the running tape with a predetermined tension and a magnetic head for magnetic recording and reproducing so as to achieve a stable operation of the recorder. When the stiffness of the magnetic recording medium is low, the above restraining force or controlling force is weakened, resulting in occurrence of abrasion or wrinkles of the running tape, in the worse case, breaking and severe damage thereof.

Therefore, it has been strongly required to improve the running property or durability of the magnetic recording medium.

In order to improve various properties of the magnetic recording medium, it has been attempted and already put into practice to form a back coat layer comprising plate-shaped non-magnetic particles and a binder resin on the surface opposite of the non-magnetic base film to its surface on which a magnetic recording layer is provided.

However, in the magnetic recording medium having such a back coat layer, since the back coat layer of the running tape is abraded by contacting with guide members or the like within cassette halves, there tends to be caused such a defect that the frequency of drop-outs is increased due to the abrasion of the back coat layer. For this reason, it has also been strongly required to provide a magnetic recording medium which can minimize occurrence of the drop-outs by inhibiting the back coat layer of the running tape from being abraded.

Meanwhile, the end portion of a magnetic recording medium such as a magnetic tape, especially a video tape, is judged by detecting a portion of the magnetic recording medium at which the light transmittance is large, by a video deck. When the light transmittance of the whole part of the magnetic recording layer becomes large by the production of a thinner magnetic recording medium or the ultrafine magnetic particles dispersed in the magnetic recording layer, it is difficult to detect the tape end portion by a video deck. For reducing the light transmittance of the whole part of a magnetic recording layer, carbon black fine particles or the like are added to the magnetic recording layer. It is, therefore, essential to add carbon black fine particles or the like to a magnetic recording layer in the present video tapes.

However, addition of a large amount of non-magnetic particles such as carbon black fine particles impairs not only the enhancement of the magnetic recording density but also the development of a thinner recording layer. In order to reduce the magnetization depth from the surface of the magnetic tape and to produce a thinner magnetic recording layer, it is strongly demanded to reduce the amount of non-magnetic particles such as carbon black fine particles which are added to a magnetic recording layer.

Consequently, it has been strongly demanded to provide a magnetic recording medium capable of exhibiting a low light transmittance even when the amount of carbon black fine particles added to the magnetic recording layer is reduced.

Further, in order to reduce not only the above-mentioned light transmittance of the magnetic recording medium but also the surface resistivity thereof, there has been hitherto proposed a method of adding carbon black fine particles to the magnetic recording layer.

The conventional magnetic recording medium to which carbon black fine particles are added, is described in detail below.

When a magnetic recording medium has a high surface resistivity, an electrostatic charge thereon tends to be increased, so that cut chips of the magnetic recording medium and dirt or dusts are attached onto the surface of the magnetic recording medium upon production or use thereof, and as a result, the frequency of "drop-outs" becomes increased.

In order to decrease the surface resistivity of the magnetic recording medium to about 108 Q/cm², a conductive compound such as carbon black fine particles has been ordinarily added to the magnetic recording layer in an amount of about 5 to 20 parts by weight based on 100 parts of magnetic particles contained in the magnetic recording layer.

The larger the amount of the carbon black fine particles added to the magnetic recording layer, the lower the light transmittance of the magnetic recording medium and the smaller the surface resistivity value thereof. However, when the amount of carbon black fine particles added which cannot contribute to improvement in magnetic properties of the magnetic recording layer, is increased, the magnetic recording medium is deteriorated in high-density recording performance, and the magnetic recording layer thereof is inhibited from being thinned. Further, when an excess amount of carbon black fine particles are present in the magnetic recording layer, these carbon black fine particles cannot be sufficiently bonded by a binder resin and, therefore, desorbed from the magnetic recording medium, resulting in increased drop-outs.

In order to further improve the running property of the magnetic recording medium, in addition to the formation of the above back coat layer, it has been attempted to cause the surface of the magnetic recording medium to be more slidable.

Namely, the running property of magnetic recording medium is ensured by incorporating a fatty acid such as myristic acid or stearic acid (hereinafter referred to merely as "myristic acid") in an amount of usually about 0.5 to 5% by weight based on the weight of magnetic particles, into the magnetic recording layer generally formed as an upper layer of the magnetic recording medium, and then allowing the myristic acid to be gradually oozed onto the surface of the magnetic recording layer so as to cause the surface to be slidable.

When the amount of the myristic acid oozed onto the surface of the magnetic recording layer is too small, it is not possible to ensure a good running property of the magnetic recording medium. On the other hand, when a too large amount of the myristic acid is added to the magnetic recording layer so as to allow a large amount of myristic acid to be oozed onto the surface thereof, the myristic acid is preferentially adsorbed onto the surface of each magnetic particle dispersed in the magnetic recording layer, thereby inhibiting the magnetic particles from being contacted with or adsorbed into resins. As a result, it is difficult to disperse the magnetic particles in vehicle. Also, the increase in amount of the myristic acid as a non-magnetic component causes deterioration in magnetic properties of the magnetic recording medium. Further, since the myristic acid acts as a plasticizer, there arise problems such as deterioration in mechanical strength of the magnetic recording medium.

With the recent tendency toward further reduction in thickness of the magnetic recording layer, the absolute amount of myristic acid which can be added to the magnetic recording layer is decreased. In addition, since the particle size of the magnetic particles have become much finer in order to meet the requirement of high-density recording, the BET specific surface area thereof is increased, so that a large amount of myristic acid is absorbed onto the surfaces of the magnetic particles. For this reason, it is more and more difficult to properly adjust the amount of the myristic acid oozed onto the surface of the magnetic recording layer so as to ensure a good running property of the magnetic recording layer.

Accordingly, it has been strongly required to further enhance a running property of the magnetic recording medium by appropriately controlling not only the amount of myristic acid oozed onto the surface of the magnetic recording layer, but also the amount of myristic acid oozed onto the surface of the back coat layer so as to cause even the rear surface of the magnetic recording medium to be slidable.

As conventional magnetic recording media which are improved in running property or durability, there have been known (1) a magnetic recording medium having a back coat layer in which plate-shaped hematite particles and carbon black fine particles acting as a solid lubricant are dispersed in a binder resin (Japanese Patent Publication (KOKOKU) No. 7-70043(1995), Japanese Patent No. 2945696, and Japanese Patent Application Laid-Open (KOKAI) Nos. 4-228108(1992), 8-129742(1996) and 11-273053(1999)); (2) a magnetic recording medium having a back coat layer in which plate-shaped magnetite particles and carbon black fine particles are dispersed in a binder resin (Japanese Patent Application Laid-Open (KOKAI) No. 9-198650(1997)); or the like.

There is also known the magnetic recording medium having a undercoat layer containing non-magnetic particles, which is formed between a non-magnetic base film and a magnetic recording layer, wherein the non-magnetic particles are black acicular composite iron-based particles obtained by adhering carbon black onto the surfaces of acicular hematite particles or acicular iron oxide hydroxide particles (Japanese Patent Application Laid-Open (KOKAI) No. 11-242812(1999) and European Patent Application Laid-Open No. 0924690).

Thus, it has been strongly demanded to provide a magnetic recording medium which is excellent in running property and durability and capable of minimizing occurrence of drop-outs, and exhibits a low light transmittance. However, there is provided no magnetic recording media which sufficiently satisfy these requirements.

Specifically, in any of the above-mentioned conventional magnetic recording media (1) and (2), it has been attempted to impart a durability thereto by increasing an elastic modulus of the coating film by incorporating the plate-shaped particles into the back coat layer, and to improve a running property thereof by incorporating carbon black fine particles having a solid lubrication property thereinto. However, since the plate-shaped particles tend to be agglomerated together mainly due to surface-to-surface contact therebetween and, therefore, tend to be present in non-uniform dispersed condition, it becomes difficult to uniformly orient the plate-shaped particles contained in the back coat layer in both the machine and transverse directions so as to be associated with each other in point-or line-contact manner. As a result, these conventional magnetic recording media cannot be sufficiently improved in running property and durability.

In particular, when a large amount of carbon black fine particles are added together with the plate-shaped particles, uniform orientation of the plate-shaped particles in both the machine and transverse directions is inhibited by the existence of the carbon black fine particles which are difficult to uniformly disperse due to the fineness thereof, resulting in formation of a defective back coat layer having portions where the plate-shaped particles are deficient. Therefore, the obtained magnetic recording medium is not only insufficient in durability, but also suffers from curling in themselves, resulting in deteriorated running property.

Further, in the above-described conventional magnetic recording medium (1), since reddish brown plate-shaped hematite particles are as the plate-shaped particles, it becomes difficult to sufficiently reduce the light transmittance of the magnetic recording medium. The above Japanese Patent Application Laid-Open (KOKAI) No. 9-198650 (1997) described this fact as "It has been proposed that non-magnetic particles are incorporated in the magnetic recording medium to enhance the stiffness thereof. Examples of the magnetic recording media in which particles other than carbon black are incorporated into a back coat layer thereof, may include . . . . However, when such non-magnetic particles are used, the obtained magnetic recording media are deteriorated in light-shielding property and conductivity". Also, as apparently recognized from the Comparative Example 5 in which the plate-shaped hematite particles are used as the non-magnetic particles, such a magnetic recording medium exhibits a large light transmittance value.

In addition, in the conventional magnetic recording medium (2), since the plate-shaped magnetite particles are used as the plate-shaped particles, the obtained magnetic recording medium can show a higher effect of reducing a light transmittance than that using the above reddish brown plate-shaped hematite particles. However, the plate-shaped magnetite particles have a magnetism and, therefore, are strongly agglomerated together due to the magnetic force, so that it is difficult to uniformly orient the particles in the machine and transverse directions of the magnetic recording medium.

As a result of the present inventors' earnest studies, it has been found that in a magnetic recording medium comprising a non-magnetic base film; a magnetic recording layer formed on one surface of the non-magnetic base film, comprising magnetic particles and a binder resin; and a back coat layer formed on a surface opposite of the non-magnetic base film to the surface on which the magnetic recording layer, comprising plate-shaped non-magnetic composite particles and a binder resin, by using as the plate-shaped non-magnetic composite particles, plate-shaped non-magnetic composite particles having an average plate surface diameter of 0.1 to 5.0 $\mu$m, an average thickness of 0.001 to 0.1 $\mu$m and a plate ratio (average plate surface diameter/ average thickness) of 5:1 to 100:1, comprising:

plate-shaped hematite particles as core particles;
a coating layer formed on surface of the plate-shaped hematite particles, comprising at least one organosilicon compound selected from the group consisting of:
(1) organosilane compounds obtained from alkoxysilane compounds, and
(2) polysiloxanes or modified polysiloxanes; and
a carbon black coat formed on the coating layer comprising said organosilicon compound, in an amount of from more than 1 to 30 parts by weight based on 100 parts by weight of the plate-shaped hematite particles, the obtained magnetic recording medium is not only excellent in running property and durability but also capable of minimizing occurrence of drop-outs, and exhibits a low light transmittance. The present invention has been attained on the basis of this finding.

SUMMARY OF THE INVENTION

It is an object of the present invention to provide a magnetic recording medium which is not only excellent in running property and durability but also capable of minimizing occurrence of drop-outs, and exhibits a low light transmittance.

To accomplish the aim, in a first aspect of the present invention, there is provided a magnetic recording medium comprising:

a non-magnetic base film;
a magnetic recording layer formed on one surface of the non-magnetic base film, comprising a binder resin and magnetic particles; and
a back coat layer formed on a surface opposite of the non-magnetic base film to the surface on which the magnetic recording layer is formed, comprising a binder resin and plate-shaped non-magnetic composite particles having an average plate surface diameter of 0.1 to 5.0 $\mu$m, an average thickness of 0.001 to 0.1 $\mu$m and a plate ratio (average plate surface diameter/ average thickness) of 5:1 to 100:1, comprising:
plate-shaped hematite particles as core particles,
a coating layer formed on surface of the plate-shaped hematite particle, comprising at least one organosilicon compound selected from the group consisting of:
(1) organosilane compounds obtained from an alkoxysilane compounds, and
(2) polysiloxanes or modified polysiloxanes, and
a carbon black coat formed on the coating layer comprising at least one organosilicon compound, in an amount of from more than 1 to 30 parts by weight based on 100 parts by weight of the plate-shaped hematite particles.

In a second aspect of the present invention, there is provided a method of forming a magnetic recording medium comprising a non-magnetic base film, a magnetic recording layer comprising a binder resin and magnetic particles, and a back coat layer formed on a surface opposite of the non-magnetic base film to the surface on which the magnetic recording layer is formed, comprising a binder resin and non-magnetic particles, comprising:

using as non-magnetic particles plate-shaped non-magnetic composite particles having an average plate surface diameter of 0.1 to 5.0 $\mu$m, an average thickness of 0.001 to 0.1 $\mu$m and a plate ratio (average plate surface diameter/average thickness) of 5:1 to 100:1, comprising
plate-shaped hematite particles as core particles;
a coating layer formed on surface of the plate-shaped hematite particle, comprising at least one organosilicon compound selected from the group consisting of:
(1) organosilane compounds obtained from an alkoxysilane compounds, and
(2) polysiloxanes or modified polysiloxanes; and
a carbon black coat formed on the coating layer comprising at least one organosilicon compound, in an amount of from more than 1 to 30 parts by weight based on 100 parts by weight of the plate-shaped hematite particles.

DETAILED DESCRIPTION OF THE INVENTION

The present invention will be described in detail below.

First, the back coat layer of the magnetic recording medium according to the present invention is described.

The back coat layer of the magnetic recording medium according to the present invention is formed on the surface opposite of the non-magnetic base film to its surface on which the magnetic recording layer is formed, and contains plate-shaped non-magnetic particles and a binder resin.

As the non-magnetic base film, there may be exemplified those presently used for the production of ordinary magnetic recording media. Specific examples of the non-magnetic base films may include synthetic resin films such as those made of polyethylene terephthalate, polyethylene, polypropylene, polycarbonates, polyethylene naphthalate, polyamides, polyamideimides, polyimides or the like; metal foils or plates such as those made of aluminum, stainless steels or the like; or various kinds of papers. The thickness of the non-magnetic base film is varied depending upon materials thereof, and is preferably in the range of 1.0 to 300 $\mu$m, more preferably 2.0 to 200 $\mu$m.

The plate-shaped non-magnetic particles used in the present invention are such plate-shaped non-magnetic composite particles which comprise plate-shaped hematite particles as core particles; a coating layer formed on the surfaces of the plate-shaped hematite particles, comprising organosilicon compounds selected from organosilane compounds obtained from alkoxysilane compounds, or polysiloxanes; and a carbon black coat formed on at least a part of the coating layer.

The lower limit of the average plate surface diameter of the plate-shaped hematite particles is usually 0.09 $\mu$m, preferably 0.54 $\mu$m, and the upper limit thereof is usually 4.99 $\mu$m, preferably 2.99 $\mu$m, more preferably 1.44 $\mu$m; the lower limit of the average thickness of the plate-shaped hematite particles is usually 0.001 $\mu$m, preferably 0.009 $\mu$m, more preferably 0.017 $\mu$m and the upper limit thereof is usually 0.099 $\mu$m, preferably 0.089 $\mu$m, more preferably 0.074 $\mu$m; and the lower limit of the plate ratio (average plate surface diameter/average thickness) of the plate-shaped hematite particles is usually 5:1, preferably 8:1, more preferably 11:1, and the upper limit thereof is usually 100:1, preferably 48:1.

When the average plate surface diameter of the plate-shaped hematite particles is more than 4.99 $\mu$m, the obtained plate-shaped non-magnetic composite particles becomes coarse particles, resulting in deteriorated tinting strength. As a result, it is difficult to reduce the light transmittance of the magnetic recording medium obtained using such non-magnetic plate-shaped composite particles. When the average plate surface diameter of the plate-shaped hematite particles is less than 0.09 $\mu$m, such plate-shaped hematite particles tend to be agglomerated together because of the increase of the intermolecular force due to the fine particles. As a result, it is difficult to uniformly form a coating layer comprising organosilicon compounds composed of alkoxysilanes or polysiloxanes on the surface of the plate-shaped hematite particle, and to uniformly form a carbon black coat thereon.

When the average thickness of the plate-shaped hematite particles is more than 0.099 $\mu$m, the obtained plate-shaped non-magnetic composite particles becomes coarse particles, resulting in deteriorated tinting strength. As a result, it is difficult to reduce the light transmittance of the magnetic recording medium obtained using such non-magnetic composite particles. When the average thickness of the plate-shaped hematite particles is less than 0.001 $\mu$m, such plate-shaped hematite particles tend to be agglomerated together because of the increase of the intermolecular force due to the fine particles. As a result, it is difficult to uniformly form a coating layer comprising organosilicon compounds composed of alkoxysilanes or polysiloxanes on the surface of the plate-shaped hematite particle, and to uniformly form a carbon black coat thereon.

When the plate ratio of the plate-shaped hematite particles is more than 100:1, such particles tend to cause surface-to-surface contact with each other and be stacked together. As a result, it is difficult to uniformly form a coating layer comprising organosilicon compounds composed of alkoxysilanes or polysiloxanes on the surface of the plate-shaped hematite particle, and to uniformly form a carbon black coat thereon.

The plate-shaped hematite particles may contain Si compounds in an amount of 0.01 to 10% by weight (calculated as Si) based on the weight of the plate-shaped hematite particles.

When the content of the Si compounds is out of the above-specified range, it is difficult to control the myristic acid absorption. With the consideration of improvement of myristic acid absorption, the content of the Si compounds is preferably in the range of 0.02 to 5% by weight.

The lower limit of the BET specific surface area of the plate-shaped hematite particles as core particles is usually 1.0 $m^2$/g, preferably 5.0 $m^2$/g, and the upper limit thereof is usually 150 $m^2$/g, preferably 120 $m^2$/g, more preferably 100 $m^2$/g. When the BET specific surface area is less than 1.0 $m^2$/g, the plate-shaped hematite particles as core particles may become coarse particles, so that the obtained plate-shaped non-magnetic composite particles also may become coarse particles and tend to be deteriorated in tinting strength and as a result, it may be difficult to reduce the light transmittance of the magnetic recording medium obtained. On the other hand, when the BET specific surface area thereof is more than 150 $m^2$/g, the intermolecular force between the particles may be increased due to the fineness thereof, so that it may become difficult to uniformly form a coating layer comprising organosilicon compounds composed of alkoxysilanes or polysiloxanes on the surface of the plate-shaped hematite particle, and uniformly form the carbon black coat on the surface of the coating layer composed of the organosilicon compounds.

As to the particle diameter distribution of the plate-shaped hematite particles used as core particles, the geometrical standard deviation value thereof is preferably not more than 2.5, more preferably not more than 2.0, still more preferably not more than 1.8. When the geometrical standard deviation value thereof is more than 2.5, coarse particles may be contained therein, so that it may also become difficult to uniformly form a coating layer comprising organosilicon compounds composed of alkoxysilanes or polysiloxanes on the surface of the plate-shaped hematite particle, and uniformly form the carbon black coat on the surface of the coating layer composed of the organosilicon compounds. The lower limit of the geometrical standard deviation value is 1.01 under the consideration of an industrial productivity.

The volume resistivity value of the core particles is usually about $1 \times 10^7$ to $1 \times 10^9$ $\Omega \cdot$cm.

The myristic acid adsorption of the core particles is usually 0.6 to 1.0 mg/$m^2$, preferably 0.6 to 0.9 mg/$m^2$.

In the plate-shaped hematite particles used as core particles in the present invention, the surfaces of the plate-shaped hematite particles as the core particles may be preliminarily coated with at least one compound selected from the group consisting of hydroxide of aluminum, oxides of aluminum, hydroxides of silicon and oxides of silicon (hereinafter referred to as "hydroxides and/or oxides of aluminum and/or silicon"), if required. In this case, since it is possible to more effectively reduce the carbon black desorption percentage, the dispersibility of the obtained plate-shaped non-magnetic composite particles in a vehicle during the production of the back coat layer may become improved as compared to those having no hydroxides and/or oxides of aluminum and/or silicon coat, so that a magnetic recording medium having more excellent durability, can be obtained.

The amount of the hydroxides and/or oxides of aluminum and/or silicon coat is preferably 0.01 to 50% by weight (calculated as Al, $SiO_2$ or a sum of Al and $SiO_2$) based on the weight of the hematite particles as the core particles.

When the amount of the hydroxides and/or oxides of aluminum and/or silicon coat is less than 0.01% by weight, the improvement of the dispersibility of the obtained plate-shaped non-magnetic composite particles in a vehicle cannot be achieved. On the other hand, when the amount of the hydroxides and/or oxides of aluminum and/or silicon coat is more than 50% by weight, the obtained plate-shaped non-magnetic composite particles can exhibit a good dispersibility in a vehicle, but it is meaningless because the dispersibility cannot be further improved by using such an excess amount of the hydroxides and/or oxides of aluminum and/or silicon coat.

The plate-shaped hematite particles having the hydroxides and/or oxides of aluminum and/or silicon coat may be substantially identical in a particle size, a geometrical standard deviation of particle sizes, a BET specific surface area and a blackness (L* value), to those having no hydroxides and/or oxides of aluminum and/or silicon coat.

The coating layer formed on the surface of the core particle comprises at least one organosilicon compound selected from the group consisting of (1) organosilane compounds obtained from alkoxysilane compounds; and (2) polysiloxanes or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "1 terminal-modified polysiloxanes").

The organosilane compounds (1) can be produced from alkoxysilane compounds represented by the formula (I):

$$R^1_a SiX_{4-a} \quad (I)$$

wherein $R^1$ is $C_6H_5-$, $(CH_3)_2CHCH_2-$ or $n-C_bH_{2b+1}-$ (wherein b is an integer of 1 to 18); X is $CH_3O-$ or $C_2H_5O-$; and a is an integer of 0 to 3.

The alkoxysilane compounds may be dried or heat-treated for producing the organosilane compounds (1), for example, at a temperature of usually 40 to 200° C., preferably 60 to 150° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethyoxysilane, methyltrimethoxysilane, dimethyldimethoxysilane and isobutyltrimethoxysilane are preferred, and methyltriethoxysilane and methyltrimethoxysilane are more preferred.

As the polysiloxanes (2), there may be used those compounds represented by the formula (II):

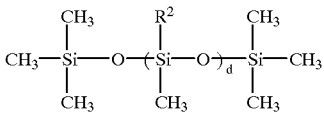

wherein $R^2$ is H— or $CH_3-$, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:
(a1) polysiloxanes modified with polyethers represented by the formula (III):

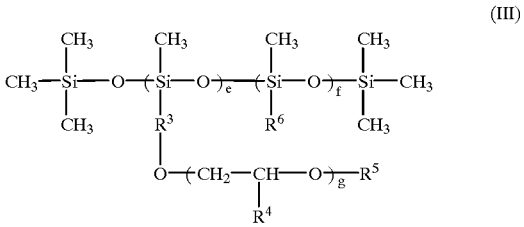

wherein $R^3$ is $-(-CH_2-)_h-$; $R^4$ is $-(-CH_2-)_i-CH_3$; $R^5$ is $-OH$, $-COOH$, $-CH=CH_2$, $-CH(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

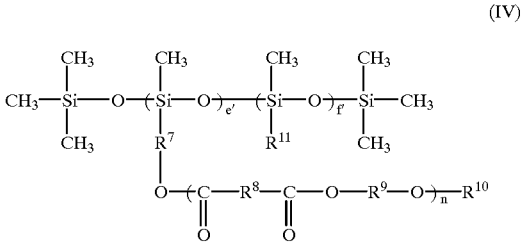

wherein $R^7$, $R^8$ and $R^9$ are $-(-CH_2-)_q-$ and may be the same or different; $R^{10}$ is $-OH$, $-COOH$, $-CH=CH_2$, $-CH(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

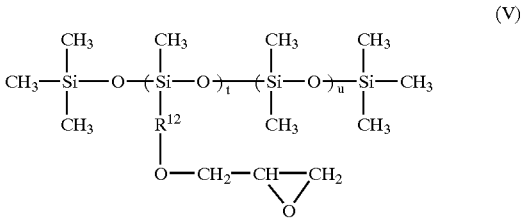

wherein $R^{12}$ is $-(-CH_2-)_v-$; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

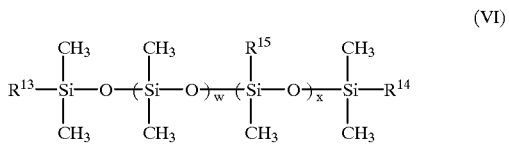

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; wherein y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the hematite particles coated with the organosilicon compounds.

When amount of the coating layer composed of the organosilicon compounds is less than 0.02% by weight, it may become difficult to form the carbon black coat on the coating layer in such an amount enough to improve the volume resistivity thereof. On the other hand, even when the coating amount of the organosilicon compounds is more than 5.0% by weight, a sufficient amount of carbon black can be coated on the coating layer. However, it is meaningless because the effects cannot be further improved by using such an excess amount of the organosilicon compounds.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN BLACK INTERNATIONAL COMPANY), BLACK PEARLS-L, BLACK PEARLS 1000, BLACK PEARLS 4630, VULCAN XC72, REGAL 660, REGAL 400, etc. (tradename, produced by CABOT SPECIALTY CHEMICALS INK CO., LTD.), or the like.

Further, in the consideration of more uniform coat of carbon black to the coating layer comprising at least one organosilicon compound, the carbon black fine particles having a DBP oil absorption of not more than 180 ml/100 g is preferred. Especially, there may be exemplified #3050, #3150, #3250, MA100, MA7, #1000, #2400B, #30, MA77, MA8, #650, MA11, #50, #52, #45, #2200B, MA600 (tradename, produced by MITSUBISHI CHEMICAL CORP.), SEAST 9H, SEAST 7H, SEAST 6, SEAST 3H, SEAST 300, SEAST FM (tradename, produced by TOKAI CARBON CO., LTD.), Raven 1250, Raven 860, Raven 1000, Raven 1190 ULTRA (tradename, produced by COLOMBIAN CHEMICALS COMPANY), BLACK PEARLS-L, BLACK PEARLS 1000, BLACK PEARLS 4630, REGAL 660, REGAL 400 (tradename, produced by CABOT SPECIALTY CHEMICALS INK CO., LTD.).

The lower limit of the average particle size of the carbon black fine particles used is usually 0.002 $\mu$m, preferably 0.005 $\mu$m, and the upper limit thereof is usually 0.05 $\mu$m, preferably 0.035 $\mu$m. When the average particle size of the carbon black fine particles used is less than 0.002 $\mu$m, the carbon black fine particles used are too fine to be well handled.

On the other hand, when the average particle size thereof is more than 0.05 $\mu$m, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black coat formed is usually 1 to 30 parts by weight, preferably 3 to 25 parts by weight based on 100 parts by weight of the plate-shaped hematite particles as the core particles.

When the amount of the carbon black coat formed is less than 1 part by weight, the volume resistivity of the obtained plate-shaped non-magnetic composite particles may not be reduced. On the other hand, when the amount of the carbon black coat formed is more than 30 parts by weight, the carbon black may tend to be desorbed from the coating layer because of too much amount of the carbon black coat formed thereonto, though the obtained plate-shaped non-magnetic composite particles can show a sufficient volume resistivity value. As a result, the desorbed carbon black may inhibit the plate-shaped non-magnetic composite particles from being homogeneously dispersed in vehicle.

The thickness of carbon black coat formed is preferably not more than 0.04 $\mu$m, more preferably not more than 0.03 $\mu$m. still more preferably not more than 0.02 $\mu$m. The lower limit thereof is more preferably 0.0001 $\mu$m.

The particle shape and particle size of the plate-shaped non-magnetic composite particles are considerably varied depending upon those of the plate-shaped hematite particles as core particles. The plate-shaped non-magnetic composite particles have a similar particle shape to that of the plate-shaped hematite particles as core particle, and a slightly larger particle size than that of the plate-shaped hematite particles as core particles.

The lower limit of the average plate surface diameter of the plate-shaped non-magnetic composite particles used in the present invention is usually 0.1 $\mu$m, preferably 0.55 $\mu$m and the upper limit thereof is usually 5.0 $\mu$m, preferably 3.0 $\mu$m, more preferably 1.45 $\mu$m; lower limit of the average thickness of the plate-shaped non-magnetic composite particles used in the present invention is usually 0.001 $\mu$m, preferably 0.010 $\mu$m. more preferably 0.18 $\mu$m and the upper limit thereof is usually 0.1 $\mu$m, preferably 0.090 $\mu$m, more preferably 0.075 $\mu$m; and the lower limit of the plate ratio (average plate surface diameter/average thickness) of the plate-shaped non-magnetic composite particles used in the present invention, is usually 5:1, preferably 8:1, more preferably 11:1, and the upper limit thereof is usually 100:1, preferably 48:1.

When the average plate surface diameter of the plate-shaped non-magnetic composite particles is less than 0.1 $\mu$m, the dispersion of the composite particles in the vehicle upon production of a coating composition for the back coat layer may be difficult because of the increase of the intermolecular force due to the fine particles. As a result, the obtained magnetic recording medium is deteriorated in durability. When the average thickness of the plate-shaped non-magnetic composite particles is more than 5.0 μm, the obtained particles becomes coarse particles, resulting in deteriorated tinting strength. As a result, it is difficult to reduce the light transmittance of the magnetic recording medium produced from such plate-shaped non-magnetic composite particles.

When the average thickness of the plate-shaped non-magnetic composite particles is less than 0.001 μm, the dispersion of the composite particles in the vehicle upon production of a coating composition for the back coat layer may be difficult because of the increase of the intermolecular force due to the fine particles. As a result, the obtained magnetic recording medium is deteriorated in durability.

When the plate ratio of the plate-shaped non-magnetic composite particles is more than 100:1, such particles tend to cause surface-to-surface contact with each other and be stacked together. Therefore, the dispersion of the composite particles in the vehicle upon production of a coating composition for the back coat layer may also be difficult. As a result, it is difficult to obtain a magnetic recording medium having an excellent durability.

When the plate-shaped non-magnetic composite particles are produced by using the plate-shaped hematite particles containing Si compounds as core particles, it is possible to effectively control the myristic acid absorption thereof.

As to the particle size distribution of plate surface diameters of the plate-shaped non-magnetic composite particles, the geometrical standard deviation value thereof is not more than 2.5. When the geometrical standard deviation value is more than 2.5, the plate-shaped non-magnetic composite particles is inhibited from being uniformly dispersed in the vehicle by the existence of coarse particles. Consequently, the particles are present in non-uniformly dispersed state within the black coat layer, resulting in deteriorated stiffness of the obtained coating film. With the consideration of stiffness of the coating film, the geometrical standard deviation value of the plate-shaped non-magnetic composite particles is preferably not more than 2.0, more preferably not more than 1.8. With the consideration of industrial productivity, the lower limit of the geometrical standard deviation value is 1.01.

The BET specific surface area of the plate-shaped non-magnetic composite particles used in the present invention, is usually 1 to 150 m$^2$/g, preferably 5 to 120 m$^2$/g, more preferably 5 to 100 m$^2$/g. When the BET specific surface area thereof is less than 1 m$^2$/g, the obtained plate-shaped non-magnetic composite particles may be coarse, thereby deteriorating the tinting strength, so that it may become difficult to reduce the light transmittance of the magnetic recording medium. On the other hand, when the BET specific surface area is more than 150 m$^2$/g, the plate-shaped non-magnetic composite particles tend to be agglomerated together by the increase in intermolecular force due to the reduction in particle diameter, thereby deteriorating the dispersibility in a binder resin upon production of the coating composition for the back coat layer, so that the obtained magnetic recording media may suffer from deterioration in surface smoothness, durability and electromagnetic performance.

The volume resistivity of the plate-shaped non-magnetic composite particles used in the present invention is preferably not more than 5×10$^5$ Ω·cm, more preferably 1×10$^1$ Ω·cm to 3×10$^5$ Ω·cm, still more preferably 1×10$^1$ Ω·cm to 1×10$^5$ Ω·cm. When the volume resistivity is more than 1×10$^5$ Ω·cm, it may be difficult to reduce the surface electrical resistivity value of the obtained back coat layer to a sufficiently low level.

The plate-shaped non-magnetic composite particles used in the present invention has a myristic acid adsorption of usually 0.01 to 0.5 mg/m$^2$, preferably 0.01 to 0.45 mg/m$^2$, more preferably 0.01 to 0.40 mg/m$^2$.

When the myristic acid adsorption of the plate-shaped non-magnetic composite particles is less than 0.01 mg/m$^2$, it may be difficult to control the amount of myristic acid oozed onto the surface of the back coat layer, due to less amount of myristic acid adsorbed into the plate-shaped non-magnetic composite particles. As a result, upon repeated use of the magnetic recording medium, it may be difficult to maintain a sufficiently low friction coefficient thereof for a long period of time.

When the myristic acid adsorption of the plate-shaped non-magnetic composite particles is more than 0.5 mg/m$^2$, the amount of myristic acid adsorbed into the plate-shaped non-magnetic composite particles becomes too large. As a result, the amount of myristic acid oozed onto the surface of the back coat layer may become comparatively small, so that it may be difficult to ensure a good running property of the obtained magnetic recording medium.

The percentage of desorption of carbon black from the plate-shaped non-magnetic composite particles used in the present invention, is preferably not more than 20%, more preferably not more than 10%. When the desorption percentage of the carbon black is more than 20%, the desorbed carbon black may tend to inhibit the plate-shaped non-magnetic composite particles from being uniformly dispersed in the binder resin upon production of the coating composition for the back coat layer, so that it may become difficult to obtain magnetic recording media which are excellent in surface smoothness, durability.

The plate-shaped non-magnetic composite particles in which the plate-shaped hematite particle as a core particle is coated with the hydroxides and/or oxides of aluminum and/or silicon have substantially the same particle size, geometrical standard deviation value, BET specific surface area value, volume resistivity value and myristic acid absorption as those of the plate-shaped non-magnetic composite particles in which the plate-shaped hematite particle as a core particle is uncoated with the hydroxides and/or oxides of aluminum and/or silicon, and exhibit a slightly less carbon black desorption percentage than that of the plate-shaped non-magnetic composite particles in which the plate-shaped hematite particle as a core particle is uncoated with the hydroxides and/or oxides of aluminum and/or silicon.

As the binder resin used in the present invention, the following resins which are at present generally used for the production of a back coat layer are usable: vinyl chloride-vinyl acetate copolymer, vinyl chloride-vinyl acetate-maleic acid copolymer, urethane resin, styrene-butadiene copolymer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH$_2$, wherein M represents H, Na or K. With the consideration of the dispersibility of the plate-shaped non-magnetic composite particles upon the production of the coating composition, a binder resin containing a functional group —COOH or —SO$_3$M is preferable.

The back coat layer may contain, if required, additives used for the production of ordinary magnetic recording media such as a lubricant, a polishing agent and an antistatic agent in an amount of about 0.1 to 50 parts by weight based on 100 parts by weight of the binder resin.

The back coat layer of the present invention has a thickness of preferably 0.1 to 2.0 µm, more preferably 0.2 to 1.5 µm. When the thickness of the back coat layer is less than 0.1 µm, the back coat layer tends to be insufficient in stiffness, so that it may be difficult to obtain a magnetic recording medium exhibiting a sufficient running durability. When the thickness of the back coat layer is more than 2.0 µm, the back coat layer becomes too thick, thereby failing to reduce the thickness of the obtained magnetic recording medium.

The Young's modulus (relative value to a commercially available video tape: AV T-120 produced by Victor Company of Japan, Limited) of the back coat layer of the present invention is usually not less than 100, preferably not less than 105. When the Young's modulus is less than 100, the stiffness of the back coat layer may be insufficient and as a result, it may be difficult to improve the running durability of the obtained magnetic recording medium.

The linear absorption of the non-magnetic base film provided on one surface thereof with the back coat layer, is preferably 1.8 to 4.0 $\mu m^{-1}$, more preferably 2.0 to 4.0 $\mu m^{-1}$, and the surface resistivity value thereof is preferably $1 \times 10^3$ to $5 \times 10^8$ $\Omega/cm^2$, more preferably $1 \times 10^3$ to $5 \times 10^7$ $\Omega/cm^2$.

The magnetic recording layer of the present invention comprises magnetic particles and a binder resin.

As the magnetic particles used in the present invention, there may be exemplified magnetic iron oxide particles such as maghemite particles, magnetite particles and berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; magnetic iron oxide particles obtained by coating the surface of the above-mentioned magnetic iron oxide particles or those containing different kinds of elements, with cobalt, both cobalt and iron or the like (hereinafter referred to merely as "magnetic cobalt-coated iron oxide particles"); magnetic metal particles containing iron as a main component; magnetic metal particles containing iron as a main component and elements other than Fe at least one selected from the group consisting of Co, Al, Ni, P, Si, Zn, B, Nd, La, Sm and Y, including magnetic iron-based alloy particles; magnetoplumbite-type ferrite particles such as plate-like ferrite particles containing Ba, Sr or Ba-Sr; plate-like magnetoplumbite-type ferrite particles obtained by incorporating divalent metals or tetravalent metals (such as Co, Ni, Zn, Mg, Mn, Nb, Cu, Ti, Sn, Zr, Mo or the like) as a coercive force-reducing agent in the plate-like magnetoplumbite-type ferrite particles; or the like.

With the consideration of the high-density recording, magnetic metal particles containing iron as a main component, magnetic cobalt-coated iron oxide particles and magnetic iron-based alloy particles containing elements other than Fe at least one selected from the group consisting of Co, Al, Ni, P, Si, Zn, B, Nd, La, Sm, Y or the like are preferable.

Especially, the magnetic metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y are more preferable from the point of the durability of the magnetic recording medium. Further, the magnetic acicular metal particles containing iron as a main component comprising iron, Al and at least one rare-earth metal such as Nd, La and Y are still more preferable.

More specifically, the magnetic acicular metal particles containing iron as a main component may be exemplified as follows.

1) Magnetic acicular metal particles comprise iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprise iron; and aluminum of usually 0.05 to 10% by weight, preferably 0.1 to 7% by weight (calculated as Al) based on the weight of the magnetic acicular metal particles.

3) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprise iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprise iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprise iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprise iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the above particles is the balance, and is preferably 50 to 99% by weight, more preferably 60 to 95% by weight (calculated as Fe) based on the weight of the magnetic particles containing iron as a main component.

From the consideration of the excellent durability of the magnetic recording medium, it is preferred to use as magnetic particles magnetic acicular metal particles containing iron as a main component, which contain aluminum of 0.05 to 10% by weight (calculated as Al) based on the weight of the magnetic acicular metal particles containing iron as a main component, which are present within the particle.

It is more preferable to use as magnetic particles magnetic acicular metal particles containing iron as a main component containing Al in an amount of 0.05 to 10% by weight (calculated as Al) based on the weight of the magnetic acicular metal particles and a rare-earth metal such as Nd, La and Y in an amount of 0.05 to 10% by weight (calculated as element) based on the weight of the magnetic acicular metal particles. Especially, magnetic acicular metal particles containing iron as a main component containing Al and Nd therein are the even more preferable.

The magnetic particles may have not only an acicular shape but also a cubic shape, a plate-like shape or the like. Meanwhile, the term "acicular shape" used herein should be construed as including "needle shape", "spindle shape", "rice grain shape" and the like.

The magnetic particles have an average major axial diameter (or average plate surface diameter) of usually 0.01 to 0.50 µm, preferably 0.03 to 0.30 µm; an average minor axial diameter (or an average thickness) of usually 0.0007 to 0.17 µm, preferably 0.003 to 0.10 µm; and a geometrical standard deviation of major axial diameters of usually not more than 2.5, preferably 1.01 to 2.3.

When the magnetic particles have an acicular shape, the aspect ratio thereof is usually not less than 3:1, preferably not less than 5:1. In the consideration of good dispersibility of the particles in vehicle upon the production of a magnetic coating composition, the upper limit of the aspect ratio is usually 15:1, preferably 10:1.

When the magnetic particles have a plate shape, the plate ratio thereof is usually not less than 2:1, preferably not less than 3:1. In the consideration of good dispersibility of the particles in vehicle upon the production of a magnetic coating composition, the upper limit of the plate ratio is usually 20:1, preferably 15:1.

As to magnetic properties of the magnetic particles, in the case of acicular magnetic iron oxide particles or Co-coated acicular magnetic iron oxide particles, the coercive force value thereof is usually 19.9 to 135.3 kA/m (250 to 1,700 Oe), preferably 23.9 to 135.3 kA/m (300 to 1,700 Oe); and the saturation magnetization value thereof is usually 60 to 90 $Am^2/kg$ (60 to 90 emu/g), preferably 65 to 90 $Am^2/kg$ (65 to 90 emu/g).

In the case of acicular magnetic metal particles containing iron as a main component or acicular magnetic alloy particles containing iron as a main component, the coercive force value thereof is usually 63.7 to 278.5 kA/m (800 to 3,500 Oe), preferably 71.6 to 278.5 kA/m (900 to 3,500 Oe); and the saturation magnetization value thereof is usually 90 to 170 $Am^2/kg$ (90 to 170 emu/g), preferably 100 to 170 $Am^2/kg$ (100 to 170 emu/g).

In the case of plate-like magnetoplumbite-type ferrite particles, the coercive force value thereof is usually 39.8 to 318.3 kA/m (500 to 4,000 Oe), preferably 51.7 to 318.3 kA/m (650 to 4,000 Oe); and the saturation magnetization value thereof is usually 40 to 70 $Am^2/kg$ (40 to 70 emu/g), preferably 45 to 70 $Am^2/kg$ (45 to 70 emu/g).

As the binder resin, the same binder resin as that used for the production of the back coat layer is usable.

It is possible to add an additive such as a lubricant, a polishing agent, an antistatic agent, etc. which are generally used for the production of a magnetic recording medium, to the magnetic recording layer. The mixing ratio of the additive to the binder resin is preferably 0.1 to 50 parts by weight based on 100 parts by weight of the binder resin.

The thickness of the magnetic recording layer obtained by applying the magnetic coating composition on the surface of the non-magnetic base film and dried, is usually in the range of 0.01 to 5.0 µm. If the thickness is less than 0.01 um, uniform coating may be difficult, so that unfavorable phenomenon such as unevenness on the coating surface may be observed. On the other hand, when the thickness exceeds 5.0 µm, it may be difficult to obtain desired electromagnetic performance due to an influence of diamagnetism. The preferable thickness is in the range of 0.05 to 4.0 µm.

The mixing ratio of the magnetic particles to the binder resin in the magnetic recording layer is usually 200 to 2,000 parts by weight, preferably 300 to 1,500 parts by weight based on 100 parts by weight of the binder resin.

When the plate-shaped non-magnetic composite particles in which the plate-shaped hematite particle as a core particle is uncoated with the hydroxides and/or oxides of aluminum and/or silicon are used as plate-shaped non-magnetic particles for the back coat layer, the obtained magnetic recording medium of the present invention exhibits a coercive force value of usually 19.9 to 318.3 kA/m (250 to 4,000 Oe), preferably 23.9 to 318.3 kA/m (300 to 4,000 Oe); a squareness (residual magnetic flux density Br/saturation magnetic flux density Bm) of usually 0.85 to 0.95, preferably 0.86 to 0.95; a gloss of coating film of usually 130 to 300%, preferably 140 to 300%; a surface roughness Ra of coating film of usually not more than 12.0 nm, preferably 2.0 to 11.0 nm, more preferably 2.0 to 10.0 nm; and a linear absorption of coating film of usually 1.20 to 5.00 $\mu m^{-1}$, preferably 1.30 to 5.00 $\mu m^{-1}$. As to the durability of the magnetic recording medium, the running durability time thereof is usually not less than 23 minutes, preferably not less than 25 minutes; and the head contamination thereof is usually rank A or B, preferably rank A. Further, in the case of the above magnetic recording medium, the drop-out performance thereof is usually not more than 20/msec, preferably not more than 16/msec; the winding non-uniformity (winding disturbance) thereof is usually rank A or B, preferably rank A; and the curling thereof is usually rank A or B, preferably rank A.

When the plate-shaped non-magnetic composite particles in which the plate-shaped hematite particle as a core particle is surface-coated with the hydroxides and/or oxides of aluminum and/or silicon are used as plate-shaped non-magnetic particles for the back coat layer, the obtained magnetic recording medium of the present invention exhibits a coercive force value of usually 19.9 to 318.3 kA/m (250 to 4,000 Oe), preferably 23.9 to 318.3 kA/m (300 to 4,000 Oe); a squareness (residual magnetic flux density Br/saturation magnetic flux density Bm) of usually 0.85 to 0.95, preferably 0.86 to 0.95; a gloss of coating film of usually 130 to 300%, preferably 140 to 300%; a surface roughness Ra of coating film of usually not more than 12.0 nm, preferably 2.0 to 11.0 nm, more preferably 2.0 to 10.0 nm; and a linear absorption of coating film of usually 1.20 to 5.00 $\mu m^{-1}$, preferably 1.30 to 5.00 $\mu m^{-1}$. As to the durability of the magnetic recording medium, the running durability time thereof is usually not less than 24 minutes, preferably not less than 26 minutes; and the head contamination thereof is usually rank A or B, preferably rank A. Further, in the case of the above magnetic recording medium, the drop-out performance thereof is usually not more than 17/msec, preferably not more than 13/msec; the winding non-uniformity thereof is usually rank A or B. preferably rank A; and the curling thereof is usually rank A or B, preferably rank A.

When acicular magnetic metal particles containing iron as a main component or acicular magnetic iron alloy particles containing iron as a main component are used as magnetic particles with the consideration of high-density recording or the like, and the plate-shaped non-magnetic composite particles in which the plate-shaped hematite particle as a core particle is uncoated with the hydroxides and/or oxides of aluminum and/or silicon are used as plate-shaped non-magnetic particles for the back coat layer, the obtained magnetic recording medium of the present invention exhibits a coercive force value of usually 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.85 to 0.95, preferably 0.86 to 0.95; a gloss of coating film of usually 185 to 300%, preferably 190 to 300%; a surface roughness Ra of coating film of usually not more than 9.5 nm, preferably 2.0 to 9.0 nm, more preferably 2.0 to 8.5 nm; and a linear absorption of coating film of usually 1.20 to 5.00 $\mu m^{-1}$ preferably 1.30 to 5.00 $\mu m^{-1}$. As to the durability of the above magnetic recording medium, the running durability time thereof is usually not less than 24 minutes, preferably not less than 26 minutes; and the head contamination thereof is usually rank A or B, preferably rank A. Further, in the case of the above magnetic recording medium, the drop-out performance thereof is usually not more than 15/msec, preferably not more than 11/msec; the winding non-uniformity thereof is usually rank A or B, preferably rank A; and the curling thereof is usually rank A or B, preferably rank A.

When the acicular magnetic metal particles containing iron as a main component or acicular magnetic iron alloy particles containing iron as a main component are used as magnetic particles, and the plate-shaped non-magnetic composite particles in which the plate-shaped hematite particle as a core particle is coated with the hydroxides and/or oxides of aluminum and/or silicon are used as plate-shaped non-magnetic particles for the back coat layer, the obtained magnetic recording medium of the present invention exhibits a coercive force value of usually 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.85 to 0.95, preferably 0.86 to 0.95; a gloss of coating film of usually 185 to 300%, preferably 190 to 300%; a surface roughness Ra of coating film of usually not more than 9.5 nm, preferably 2.0 to 9.0 nm, more preferably 2.0 to 8.5 nm; and a linear absorption of coating film of usually 1.20 to 5.00 $\mu m^{-1}$, preferably 1.30 to 5.00 $\mu m^{-1}$. As to the durability of the above magnetic recording medium, the running durability time thereof is usually not less than 25 minutes, preferably not less than 27 minutes; and the head contamination thereof is usually rank A or B, preferably rank A. Further, in the case of the above magnetic recording medium, the drop-out performance thereof is usually not more than 12/msec, preferably not more than 8/msec; the winding non-uniformity thereof is usually rank A or B, preferably rank A; and the curling thereof is usually rank A or B, preferably rank A .

The magnetic recording medium of the present invention, comprises a non-magnetic base film; a non-magnetic undercoat layer formed on the non-magnetic base film, comprising non-magnetic particles and a binder resin; and a magnetic recording layer formed on the non-magnetic undercoat layer.

As the non-magnetic particles used in the non-magnetic undercoat layer of the present invention, there may be exemplified non-magnetic inorganic particles ordinarily used for forming a non-magnetic undercoat layer in conventional magnetic recording media. Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used singly or in the form of a mixture of any two or more thereof. Among them, the use of hematite particles, iron oxide hydroxide particles, titanium oxide particles and the like is preferred.

In the present invention, in order to improve the dispersibility of the non-magnetic particles in vehicle upon the production of non-magnetic coating composition, the non-magnetic particles may be surface-treated with hydroxides of aluminum, oxides of aluminum, hydroxides of silicon, oxides of silicon or the like to form a coat made of any of these compounds on the surfaces thereof. Further, the non-magnetic particles may contain Al, Ti, Zr, Mn, Sn, Sb or the like inside thereof, if required, in order to improve various properties of the obtained magnetic recording media such as light transmittance, surface resistivity, mechanical strength, surface smoothness, durability or the like.

In the consideration of surface smoothness of the obtained non-magnetic undercoat layer, the non-magnetic particles preferably have an acicular shape. The term "acicular shape" used herein should be construed as including "needle shape", "spindle shape", "rice grain shape" or the like.

When the non-magnetic particles are of a granular shape, the average particle size thereof is usually 0.01 to 0.3 $\mu$m, preferably 0.015 to 0.25 $\mu$m, more preferably 0.02 to 0.2 mm. When the non-magnetic particles are of an acicular shape, the average major axis diameter thereof is usually 0.01 to 0.3 $\mu$m, preferably 0.015 to 0.25 $\mu$m, more preferably 0.02 to 0.2 $\mu$m. When the non-magnetic particles are of a plate-like shape, the average plate surface diameter thereof is usually 0.01 to 0.3 $\mu$m, preferably 0.015 to 0.25 $\mu$m, more preferably 0.02 to 0.2 $\mu$m.

Further, when the non-magnetic particles are of an acicular shape, the aspect ratio thereof is usually 2:1 to 20:1, preferably 2.5:1 to 15:1, more preferably 3:1 to 10:1. When the non-magnetic particles are of a plate-like shape, the plate ratio thereof is usually 2:1 to 50:1, preferably 2.5:1 to 20:1, more preferably 3:1 to 10:1.

The thickness of the non-magnetic undercoat layer is preferably 0.2 to 10.0 $\mu$m. When the thickness of the non-magnetic undercoat layer is less than 0.2 $\mu$m, it may be difficult to improve the surface roughness of the non-magnetic base film, and the stiffness of a coating film formed thereon tends to be unsatisfactory. In the consideration of reduction in total thickness of the magnetic recording medium as well as the stiffness of the coating film, the thickness of the non-magnetic undercoat layer is more preferably in the range of 0.5 to 5.0 $\mu$m.

As the binder resin, the same binder resin as that used for the production of the back coat layer is usable.

The mixing ratio of the non-magnetic particles to the binder resin is usually 5 to 2000 parts by weight, preferably 100 to 1000 parts by weight based on 100 parts by weight of the binder resin.

When the content of the non-magnetic particles is as small as less than 5 parts by weight, such a non-magnetic undercoat layer in which the non-magnetic particles are uniformly and continuously dispersed may not be obtained upon coating, resulting in insufficient surface smoothness and insufficient stiffness of the non-magnetic base film. When the content of the non-magnetic particles is more than 2,000 parts by weight, the non-magnetic particles may not be sufficiently dispersed in a non-magnetic coating composition since the amount of the non-magnetic particles is too large as compared to that of the binder resin. As a result, when such a non-magnetic coating composition is coated onto the non-magnetic base film, it may become difficult to obtain a coating film having a sufficiently smooth surface. Further, since the non-magnetic particles may not be sufficiently bonded together through the binder resin, the obtained coating film tends to become brittle.

It is possible to add an additive such as a lubricant, a polishing agent, an antistatic agent, etc. which are generally used for the production of a magnetic recording medium, to the non-magnetic undercoating layer. The mixing ratio of the additive to the binder resin is preferably 0.1 to 50 parts by weight based on 100 parts by weight of the binder resin.

When the plate-shaped non-magnetic composite particles in which the plate-shaped hematite particle as a core particle is uncoated with the hydroxides and/or oxides of aluminum and/or silicon are used as plate-shaped non-magnetic particles for the back coat layer, the obtained magnetic recording medium having the non-magnetic undercoat layer according to the present invention exhibits a coercive force value of usually 19.9 to 318.3 kA/m (250 to 4,000 Oe), preferably 23.9 to 318.3 kA/m (300 to 4,000 Oe); a squareness (residual magnetic flux density Br/saturation magnetic flux density Bm) of usually 0.85 to 0.95, preferably 0.86 to 0.95; a gloss of coating film of usually 135 to 300%, preferably 145 to 300%; a surface roughness Ra of coating film of usually not more than 11.5 nm, preferably 2.0 to 10.5 nm, more preferably 2.0 to 9.5 nm; and a linear absorption of coating film of usually 1.30 to 5.00 $\mu m^{-1}$, preferably 1.40 to 5.00 $\mu m^{-1}$. As to the durability of the above magnetic recording medium, the running durability time thereof is usually not less than 24 minutes, preferably not less than 26 minutes; and the head contamination thereof is usually rank A or B, preferably rank A. Further, in the case of the above magnetic recording medium, the drop-out performance thereof is usually not more than 19/msec, preferably not more than 15/msec; the winding non-uniformity thereof is usually rank A or B, preferably rank A; and the curling thereof is usually rank A or B, preferably rank A.

When the plate-shaped non-magnetic composite particles in which the plate-shaped hematite particle as a core particle is coated with the hydroxides and/or oxides of aluminum and/or silicon are used as plate-shaped non-magnetic particles for the back coat layer, the obtained magnetic recording medium having the non-magnetic undercoat layer according to the present invention exhibits a coercive force value of usually 19.9 to 318.3 kA/m (250 to 4,000 Oe), preferably 23.9 to 318.3 kA/m (300 to 4,000 Oe); a squareness (residual magnetic flux density Br/saturation magnetic flux density Bm) of usually 0.85 to 0.95, preferably 0.86 to 0.95; a gloss of coating film of usually 135 to 300%, preferably 145 to 300%; a surface roughness Ra of coating film of usually not more than 11.5 nm, preferably 2.0 to 10.5 nm, more preferably 2.0 to 9.5 nm; and a linear absorption of coating film of usually 1.30 to 5.00 $\mu m^{-1}$, preferably 1.40 to 5.00 $\mu m^{-1}$. As to the durability of the above magnetic recording medium, the running durability time thereof is usually not less than 25 minutes, preferably not less than 27 minutes; and the head contamination thereof is usually rank A or B, preferably rank A. Further, in the case of the above magnetic recording medium, the drop-out performance thereof is usually not more than 16/msec, preferably not more than 12/msec; the winding non-uniformity thereof is usually rank A or B, preferably rank A; and the curling thereof is usually rank A or B, preferably rank A.

When acicular magnetic metal particles containing iron as a main component or acicular magnetic iron alloy particles containing iron as a main component are used as magnetic particles with the consideration of high-density recording or the like, and the plate-shaped non-magnetic composite particles in which the plate-shaped hematite particle as a core particle is uncoated with the hydroxides and/or oxides of aluminum and/or silicon are used as plate-shaped non-magnetic particles for the back coat layer, the obtained magnetic recording medium having the non-magnetic undercoat layer according to the present invention exhibits a coercive force value of usually 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.85 to 0.95, preferably 0.86 to 0.95; a gloss of coating film of usually 190 to 300%, preferably 195 to 300%; a surface roughness Ra of coating film of usually not more than 9.0 nm, preferably 2.0 to 8.5 nm, more preferably 2.0 to 8.0 nm; and a linear absorption of coating film of usually 1.30 to 5.00 $\mu m^{-1}$, preferably 1.40 to 5.00 $\mu m^{-1}$. As to the durability of the above magnetic recording medium, the running durability time thereof is usually not less than 25 minutes, preferably not less than 27 minutes; and the head contamination thereof is usually rank A or B, preferably rank A. Further, in the case of the above magnetic recording medium, the drop-out performance thereof is usually not more than 14/msec, preferably not more than 10/msec; the winding non-uniformity thereof is usually rank A or B, preferably rank A; and the curling thereof is usually rank A or B, preferably rank A.

When the acicular magnetic metal particles containing iron as a main component or acicular magnetic iron alloy particles containing iron as a main component are used as magnetic particles, and the plate-shaped non-magnetic composite particles in which the plate-shaped hematite particle as a core particle is coated with the hydroxides and/or oxides of aluminum and/or silicon are used as plate-shaped non-magnetic particles for the back coat layer, the obtained magnetic recording medium having the non-magnetic undercoat layer according to the present invention exhibits a coercive force value of usually 63.7 to 278.5 kA/m (800 to 3,500 Oe), preferably 71.6 to 278.5 kA/m (900 to 3,500 Oe); a squareness (residual magnetic flux density Br/saturation magnetic flux density Bm) of usually 0.85 to 0.95, preferably 0.86 to 0.95; a gloss of coating film of usually 190 to 300%, preferably 195 to 300%; a surface roughness Ra of coating film of usually not more than 9.0 nm, preferably 2.0 to 8.5 nm, more preferably 2.0 to 8.0 nm; and a linear absorption of coating film of usually 1.30 to 5.00 $\mu m^{-1}$, preferably 1.40 to 5.00 $\mu m^{-1}$. As to the durability of the above magnetic recording medium, the running durability time thereof is usually not less than 26 minutes, preferably not less than 28 minutes; and the head contamination thereof is usually rank A or B, preferably rank A. Further, in the case of the above magnetic recording medium, the drop-out performance thereof is usually not more than 11/msec, preferably not more than 7/msec; the winding non-uniformity thereof is usually rank A or B, preferably rank A; and the curling thereof is usually rank A or B, preferably rank A.

Next, the process for producing the plate-shaped non-magnetic composite particles used in the present invention, is described.

The coating of the plate-shaped hematite particles as core particles with the alkoxysilane compounds, the polysiloxanes, the modified polysiloxanes or the terminal-modified polysiloxanes, may be conducted (i) by mechanically mixing and stirring the plate-shaped hematite particles as core particles together with the alkoxysilane compounds, the polysiloxanes, the modified polysiloxanes or the terminal-modified polysiloxanes; or (ii) by mechanically mixing and stirring both the components together while spraying the alkoxysilane compounds, the polysiloxanes, the modified polysiloxanes or the terminal-modified polysiloxanes onto the plate-shaped hematite particles as core particles. In these cases, substantially whole amount of the alkoxysilane compounds, the polysiloxanes, the modified polysiloxanes or the terminal-modified polysiloxanes added can be applied onto the surfaces of the plate-shaped hematite particles as core particles.

In order to uniformly coat the surfaces of the plate-shaped hematite particles as core particles with the alkoxysilane compounds, the polysiloxanes, the modified polysiloxanes or the terminal-modified polysiloxanes, it is preferred that the plate-shaped hematite particles as core particles are preliminarily diaggregated by using a pulverizer.

As apparatus (a) for mixing and stirring the core particles with the alkoxysilane compounds, the polysiloxanes, the modified polysiloxanes or the terminal-modified polysiloxanes to form the coating layer thereof, and (b) for mixing and stirring carbon black fine particles with the particles whose surfaces are coated with the alkoxysilane compounds, the polysiloxanes, the modified polysiloxanes or the terminal-modified polysiloxanes to form the carbon black coat, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes or the terminal-modified polysiloxanes as uniformly as possible, the conditions of the above mixing or stirring treatment may be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes or the terminal-modified polysiloxanes added, is preferably 0.15 to 45 parts by weight based on 100 parts by weight of the plate-shaped hematite particles as core particles. When the amount of the alkoxysilane compounds, the polysiloxanes, the modified polysiloxanes or the terminal-modified polysiloxanes added is less than 0.15 part by weight, it may become difficult to form the carbon black coat in such an amount enough to improve the volume resistivity value of the obtained plate-shaped non-magnetic composite particles.

On the other hand, when the amount of the alkoxysilane compounds, the polysiloxanes, the modified polysiloxanes or the terminal-modified polysiloxanes added is more than 45 parts by weight, a sufficient amount of the carbon black coat can be formed on the surface of the coating layer, but it is meaningless because the volume resistivity value of the composite particles cannot be further improved by using such an excess amount of the alkoxysilane compounds, the polysiloxanes, the modified polysiloxanes or the terminal-modified polysiloxanes.

Next, the carbon black fine particles are added to the plate-shaped hematite particles coated with the alkoxysilane compounds, the polysiloxanes, the modified polysiloxanes or the terminal-modified polysiloxanes, and the resultant mixture is continuously mixed and stirred to form a carbon black coat on the surfaces of the coating layer composed of the alkoxysilane compounds, the polysiloxanes, the modified polysiloxanes or the terminal-modified polysiloxanes.

In addition by conducting the above-mentioned mixing or stirring treatment (b) of the carbon black fine particles together with the plate-shaped hematite particles coated with the alkoxysilane compounds, the polysiloxanes, the modified polysiloxanes or the terminal-modified polysiloxanes, at least a part of the alkoxysilane compounds coated on the plate-shaped hematite particles may be changed to the organosilane compounds.

It is preferred that the carbon black fine particles are added little by little and slowly, especially about 5 to 60 minutes.

In order to form carbon black coat onto the coating layer composed of the alkoxysilane compounds, the polysiloxanes, the modified polysiloxanes or the terminal-modified polysiloxanes as uniformly as possible, the conditions of the above mixing or stirring treatment can be appropriately controlled such that the linear load is usually 19.6 to 1960 N/cm (2 to 200 Kg/cm), preferably 98 to 1470 N/cm (10 to 150 Kg/cm), more preferably 147 to 980 N/cm (15 to 100 Kg/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 30 parts by weight based on 100 parts by weight of the plate-shaped hematite particles as core particles. When the amount of the carbon black fine particles added is less than 1 part by weight, it may become difficult to form the carbon black coat in such an amount enough to improve the volume resistivity value of the obtained composite particles. On the other hand, when the amount of the carbon black fine particles added is more than 30 parts by weight, since a sufficient volume resisitivity value of the resultant composite particles can be obtained, but it is meaningless to adhere too large amount of the carbon black.

At least a part of the surface of the plate-shaped hematite particles as core particles may be coated with at least one compound selected from the group consisting of hydroxides of aluminum, oxides of aluminum, hydroxides of silicon and oxides of silicon, in advance of mixing and stirring with the alkoxysilane compounds, the polysiloxanes, the modified polysiloxanes or the terminal-modified polysiloxanes.

The coating of the hydroxides and/or oxides of aluminum and/or silicon may be conducted by adding an aluminum compound, a silicon compound or both the compounds to a water suspension in which the plate-shaped hematite particles are dispersed, followed by mixing and stirring, and further adjusting the pH of the suspension, if required, thereby coating the surfaces of the plate-shaped hematite particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the plate-shaped hematite particles coated with the hydroxides and/or oxides of aluminum and/or silicon may be subjected to post-treatments such as deaeration treatment and compaction treatment.

As the aluminum compounds, there may be exemplified aluminum salts such as aluminum acetate, aluminum sulfate, aluminum chloride or aluminum nitrate, alkali aluminates such as sodium aluminate, or the like.

The amount of the aluminum compound added is 0.01 to 50.00% by weight (calculated as Al) based on the weight of the plate-shaped hematite particles. When the amount of the aluminum compound added is less than 0.01% by weight, it may be difficult to sufficiently coat the surfaces of the plate-shaped hematite particles with hydroxides or oxides of aluminum, thereby failing to improve the dispersibility in a vehicle. On the other hand, when the amount of the aluminum compound added is more than 50.00% by weight, the coating effect is saturated and, therefore, it is meaningless to add such an excess amount of the aluminum compound.

As the silicon compounds, there may be exemplified water glass #3, sodium orthosilicate, sodium metasilicate or the like.

The amount of the silicon compound added is 0.01 to 50.00% by weight (calculated as $SiO_2$) based on the weight of the plate-shaped hematite particles. When the amount of the silicon compound added is less than 0.01% by weight, it may be difficult to sufficiently coat the surfaces of the plate-shaped hematite particles with hydroxides or oxides of silicon, thereby failing to improve the dispersibility in a vehicle. On the other hand, when the amount of the silicon compound added is more than 50.00% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50.00% by weight (calculated as a sum of Al and $SiO_2$) based on the weight of the plate-shaped hematite particles.

Next, the process for producing the magnetic recording medium of the present invention will be described below.

The magnetic recording medium of the present invention can be produced as follows. That is, according to the ordinary method, a magnetic coating composition containing magnetic particles, a binder resin and a solvent is applied onto a non-magnetic base film so as to form a magnetic coating film thereon, and the obtained coating film is then magnetically oriented in a magnetic field. Alternatively, after applying a non-magnetic coating composition containing non-magnetic particles, a binder resin and a solvent and then drying the non-magnetic coating composition to form a non-magnetic undercoat layer thereon, the above magnetic coating composition containing magnetic particles, a binder resin and a solvent is applied onto the non-magnetic undercoat layer so as to form a magnetic coating film thereon and then the obtained coating film is magnetically oriented in a magnetic field. Then, after the obtained magnetic layer is subjected to calender treatment, a coating composition for back coat layer is applied onto the opposite surface of the non-magnetic base film and cured so as to form a back coat layer, thereby producing the magnetic recording medium.

The kneading and dispersion of the non-magnetic coating composition, the magnetic coating composition and the coating composition for black coat layer may be performed using, for example, kneaders such as twin-screw kneader, twin-screw extruder, press kneader, twin-roll mill, triple-roll mill, or dispersing apparatuses such as ball mill, sand grinder, attritor, disper, homogenizer and ultrasonic dispersion device.

The coating of the non-magnetic coating composition, the magnetic coating composition and the coating composition for the back coat layer may be conducted using gravure coater, reverse-roll coater, slit coater, die coater or the like. The thus obtained coating film may be magnetically oriented using counter magnet, solenoid magnet or the like.

As the solvents, there may be exemplified those ordinarily used for the production of conventional magnetic recording media such as methyl ethyl ketone, toluene, cyclohexanone, methyl isobutyl ketone, tetrahydrofuran or a mixture thereof.

The total amount of the solvent(s) used in the non-magnetic coating composition, the magnetic coating composition or the coating composition for the back coat layer is 65 to 1,000 parts by weight based on 100 parts by weight of the non-magnetic particles, the magnetic particles or the plate-shaped non-magnetic composite particles. When the amount of the solvent used is less than 65 parts by weight, the viscosity of the obtained non-magnetic coating composition, the magnetic coating composition or the coating composition for the back coat layer may be too high, so that it is difficult to coat such a composition. When the amount of the solvent used is more than 1,000 parts by weight, the amount of the solvent vaporized upon coating may be too large, resulting in industrial disadvantages.

The point of the present invention is that when using as plate-shaped non-magnetic particles to be incorporated into the back coat layer, the plate-shaped non-magnetic composite particles which comprise plate-shaped hematite particles as core particles, a coating layer formed on the surfaces of the plate-shaped hematite particles, comprising organosilicon compounds composed of organosilane compounds obtained from alkoxysilanes or polysiloxanes, and a carbon black coat formed on the coating layer, and which have an average plate surface diameter of 0.1 to 5.0 $\mu$m, an average thickness of 0.001 to 0.1 $\mu$m and a plate ratio of 5:1 to 100:1, there can be obtained a thin magnetic recording medium which is not only excellent in running property and durability, but also capable of minimizing occurrence of drop-outs, and exhibits a low light transmittance.

The reason why the magnetic recording medium of the present invention have excellent running property and durability, is considered as follows. That is, conventional plate-shaped non-magnetic particles to be incorporated into the back coat layer generally tend to be agglomerated and stacked together due to the plate shape, and tend to be present in unevenly dispersed state within the back coat layer. Whereas, since the plate-shaped non-magnetic composite particles used in the present invention comprise plate-shaped hematite particles on which carbon black is uniformly and densely adhered through the coating layer comprising organosilicon compounds composed of organosilane compounds obtained from alkoxysilanes or polysiloxanes, the individual composite particles can have irregularities on the surfaces thereof and, therefore, can be inhibited from causing surface-to-surface contact with each other. As a result, the plate-shaped non-magnetic composite particles can be present in uniformly oriented state in both length and width directions of the back coat layer, so that the obtained magnetic tape can exhibit a high stiffness in both the machine and transverse directions and can be effectively inhibited from undergoing undesired curling phenomenon.

In particular, in the case of the plate-shaped non-magnetic composite particles containing the Si compounds inside the core particles, it is possible to effectively control the myristic acid absorption into the surface thereof to the specific preferred range. Therefore, an appropriate amount of myristic acid can be oozed onto the surface of the magnetic recording medium, resulting in more stabilized running property and durability thereof.

The reason why the magnetic recording medium of the present invention can minimize the occurrence of drop-outs, is considered as follows. In general, the carbon black fine particles incorporated as a solid lubricant into the back coat layer tend to be agglomerated together due to the fineness thereof, so that it becomes difficult to uniformly disperse the carbon black fine particles in the binder resin. As a result, the carbon black fine particles tend to be desorbed from the surface of the back coat layer. The desorption of the carbon black fine particles is one reason for causing the drop-outs. On the contrary, in the case of the plate-shaped non-magnetic composite particles used in the present invention, since carbon black is strongly adhered on the surfaces of the plate-shaped hematite particles through the coating layer formed thereon which comprises organosilicon compounds composed of organosilane compounds obtained from alkoxysilanes or polysiloxanes, it is possible to reduce the amount of carbon black desorbed from the surface of the carbon back coat layer to the level as low as possible.

Further, the reason why the amount of carbon black desorbed from the surfaces of the plate-shaped non-magnetic composite particles can be reduced, is considered as follows. That is, in the case where alkoxysilanes are used, metalloxane bonds ($\equiv$Si—O—M, wherein M represents a metal atom contained in plate-shaped hematite particles, such as Si, Al or Fe) are formed between metal elements such as Si, Al, Fe or the like which exist within the plate-shaped hematite particles or on the surfaces of the plate-shaped hematite particles, and alkoxy groups contained in the alkoxysilanes on which the carbon black is adhered, thereby producing a strong bond between the organosilane compounds on which the carbon black is adhered, and the surfaces of the plate-shaped hematite particles.

Further, in the case where polysiloxanes are used, it is considered that various functional groups contained in the polysiloxanes on which the carbon black is adhered, can be strongly bonded to the surfaces of the plate-shaped hematite particles.

The reason why the magnetic recording medium of the present invention can exhibit a low light transmittance, is considered as follows. That is, the carbon black fine particles which usually act as agglomerates due to the fineness thereof can be uniformly and densely adhered onto the surfaces of the plate-shaped hematite particles through the coating layer formed thereon which comprises organosilicon compounds composed of organosilane compounds obtained from alkoxysilanes or polysiloxanes, so that inherent properties and functions of the carbon black can be exhibited more effectively.

Since the plate-shaped non-magnetic composite particles exhibiting an excellent dispersibility in vehicle and a well-controlled myristic acid absorption are used as non-magnetic particles for the back coat layer, the obtained magnetic recording medium of the present invention is not only excellent in running property and durability but also capable of minimizing occurrence of drop-outs, and exhibits a low light transmittance. Therefore, the magnetic recording medium of the present invention is suitably used as thin magnetic recording media.

EXAMPLES

The present invention is described in more detail by Examples and Comparative Examples, but the Examples are only illustrative and, therefore, not intended to limit the scope of the present invention.

Various properties were measured by the following methods.

(1) The average particle sizes (such as an average particle diameter, an average plate diameter, an average thickness, an average major axial diameter and an average minor axial diameter) of plate-shaped hematite particles, plate-shaped non-magnetic composite particles, carbon black fine particles, non-magnetic particles and magnetic particles were respectively expressed by the average of values (measured in a predetermined direction) of about 350 particles which were sampled from a micrograph obtained by magnifying an original electron micrograph by four times in each of the longitudinal and transverse directions.

(2) The aspect ratio of the particles was expressed by the ratio of average major axial diameter to average minor axial diameter thereof. The plate ratio of the particles was expressed by the ratio of the average plate surface diameter to the average thickness thereof.

(3) The geometrical standard deviation of plate diameter was expressed by values obtained by the following method. That is, the plate sizes were measured from the above magnified electron micrograph. The actual plate sizes and the number of the particles were calculated from the measured values. On a logarithmic normal probability paper, the plate sizes plotted at regular intervals on the abscissa-axis and the accumulative number (under integration sieve) of particles belonging to each interval of the plate sizes were plotted by percentage on the ordinate-axis by a statistical technique.

The plate sizes corresponding to the number of particles of 50% and 84.13%, respectively, were read from the graph, and the geometrical standard deviation was calculated from the following formula:

Geometrical standard deviation={plate sizes corresponding to 84.13% under integration sieve}/{plate sizes (geometrical average diameter) corresponding to 50% under integration sieve}

The closer to 1 the geometrical standard deviation value, the more excellent the plate size distribution.

(4) The specific surface area was expressed by the value measured by a BET method.

(5) The amount of Al and Si which were present within plate-shaped hematite particles or plate-shaped non-magnetic composite particles, or on surfaces thereof, and the amount of Si contained in the organosilicon compounds, were measured by a fluorescent X-ray spectroscopy device 3063 (manufactured by Rigaku Denki Kogyo Co., Ltd.) according to JIS K0119 "General rule of fluorescent X-ray analysis".

(6) The amount of carbon black coat on the surface of the plate-shaped non-magnetic composite particles was measured by "Horiba Metal, Carbon and Sulfur Analyzer EMIA-2200 Model" (manufactured by Horiba Seisakusho Co., Ltd.).

(7) The thickness of carbon black coat on the surfaces of plate-shaped non-magnetic composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The desorption percentage (T %) of carbon black desorbed from the plate-shaped non-magnetic composite particles was measured by the following method.

That is, 3 g of the plate-shaped non-magnetic composite particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the plate-shaped non-magnetic composite particles on the basis of the difference in specific gravity therebetween. Next, the thus separated plate-shaped non-magnetic composite particles were mixed again with 40 ml of ethanol, and the obtained mixture was further subjected to ultrasonic dispersion for 20 minutes. Thereafter, the obtained dispersion was allowed to stand for 120 minutes, thereby separating the plate-shaped non-magnetic composite particles and carbon black desorbed, from each other. The thus separated plate-shaped non-magnetic composite particles were dried at 1000° C. for one hour, and then the carbon content thereof was measured by the "Horiba Metal, Carbon and Sulfur Analyzer EMIA-2200 Model" (manufactured by HORIBA Seisakusho CO., LTD.). The desorption percentage (T %) was calculated according to the following formula:

$$T(\%) = \{(W_a - W_e)/W_a\} \times 100$$

wherein $W_a$ represents an amount of carbon black initially formed on the plate-shaped non-magnetic composite particles; and $W_e$ represents an amount of carbon black which still remains on the plate-shaped non-magnetic composite particles after the above desorption test.

The closer to zero the desorption percentage (T %), the smaller the amount of carbon black desorbed from the plate-shaped non-magnetic composite particles.

(9) The volume resistivity of the plate-shaped hematite particles and the plate-shaped non-magnetic composite particles was measured by the following method.

That is, first, 0.5 g of a sample particles to be measured was weighted, and press-molded at 140 Kg/cm² (13,720 kPa) using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (model 4329A, manufactured by Yokogawa-Hokushin Denki Co., Ltd.) to measure a resistance value R ($\Omega$).

The cylindrical test piece was measured with respect to an upper surface area A (cm²) and a thickness $t_0$ (cm) thereof. The measured values were inserted into the following formula, thereby obtaining a volume resistivity X ($\Omega \cdot$cm).

$$X(\Omega \cdot cm) = R \times (A/t_0)$$

(10) The myristic acid absorption of the plate-shaped hematite particles and the plate-shaped non-magnetic composite particles was measured by the following method. The lower the myristic acid absorption, the more the fatty acid becomes to ooze on the surface of the back coat layer and the lower the friction coefficient thereof.

100 g of 1.5 mmφ glass beads, 9 g of sample particles to be measured and 45 ml of a tetrahydrofuran solution containing myristic acid in an amount enough to form one layer thereof on each sample particle, were charged into a 140-ml glass bottle, and then mixed and dispersed together for 60 minutes using a paint shaker.

Next, the thus obtained dispersion was taken out, charged into a 50-ml precipitation tube and centrifuged at 10,000 rpm for 15 minutes, thereby separating a solvent portion from a solid portion. The amount (concentration) of myristic acid contained in the solvent portion was determined by a gravimetric method. By subtracting the measured value from an amount of myristic acid initially charged, the amount of myristic acid contained in the solid portion was obtained as a myristic acid absorption ($mg/m^2$) of the particles to be measured.

(11) The viscosity of the coating composition was obtained by measuring the viscosity of the coating composition at 25° C. at a shear rate D of 1.92 $sec^{-1}$ by using "E type viscometer EMD-R" (manufactured by Tokyo Keiki, Co., Ltd.).

(12) The stiffness of the coating film was expressed the Young's modulus obtained by "Autograph" (produced by Shimazu Seisakusho Co., Ltd.). The Young's modulus was expressed by the ratio value of the Young's modulus of the coating film to that of a commercially available video tape "AV T-120" (produce by Victor Company of Japan, Limited). The higher the relative value, the more favorable.

(13) The magnetic properties of the magnetic particles and magnetic recording medium were measured under an external magnetic field of 795.8 kA/m (10 kOe) by "Vibration Sample Magnetometer VSM-3S-15 (manufactured by Toei Kogyo, Co., Ltd.)".

(14) The gloss of the surface of the coating film of the magnetic recording layer was measured at an angle of incidence of 45 ° by "glossmeter UGV-5D" (manufactured by Suga Shikenki, Co., Ltd.).

(15) The surface roughness Ra is expressed by the average value of the center-line average roughness of the profile curve of the surface of the coating film of the magnetic recording layer by using "Surfcom-575A" (manufactured by Tokyo Seimitsu Co., Ltd.).

(16) The light transmittance of the back coat layer, non-magnetic undercoat layer and magnetic recording medium is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is to transmit light:

Linear adsorption coefficient ($\mu m^{-1}$)={1 n (1/t)}/FT wherein t represents a light transmittance (−) at λ=900 nm, and FT represents thickness ($\mu m$) of the coating film used for the measurement.

(17) The durability of the magnetic medium was evaluated by the following running durability and the head contamination.

The running durability was evaluated by the actual operating time under the conditions that the load was 1.96 N (200 gw) and the relative speed of the head and the tape was 16 m/s by using "Media Durability Tester MDT-3000" (manufactured by Steinberg Associates). The longer the actual operating time, the higher the running durability.

(18) The head contamination was evaluated by visually observing the magnetic head after running the magnetic tape under a load of 19.6 N (200 gw) for 30 minutes by setting a relative speed between the magnetic tape and the magnetic head to 16 m/s, using a MEDIA DURABILITY TESTER MDT-3000 (manufactured by Steinberg Associates Co. Ltd.). The evaluation results were classified into the following four ranks. The A rank represents the smallest head contamination.

A: Not contaminated

B: Slightly contaminated

C: Contaminated

D: Severely contaminated

(19) The surface resistivity of the coating film of the back coat layer was measured by the following method. That is, the coating film to be measured was exposed to the environment maintained at a temperature of 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 1.7 N (170 gw) were respectively suspended at opposite ends of the coating film so as to bring the coating film into close contact with the electrodes. D.C. 500 V was applied between the electrodes, thereby measuring the surface resistivity of the coating film.

(20) The drop-out value of the magnetic recording medium was determined by counting the number of drop-outs per a unit time using the envelope obtained by setting a relative speed between the magnetic tape and a magnetic head to 5.8 m/s, using a DRUM TESTER BX-3168 (Manufactured by BELDEX Co., ltd.).

(21) The winding non-uniformity (winding disturbance) of the magnetic recording medium is evaluated as follows. A 10 m-long magnetic tape produced from the below-mentioned composition was wound up on a take-up reel. This winding-up procedure was repeated 30 times. The winding-up condition of the magnetic tape was observed, and the observation results were classified into the following four ranks among which the rank A represents the most excellent winding condition in which the winding disturbance was minimized.

A: no winding disturbance;

B: slight winding disturbance;

C: some winding disturbance; and

D: severe winding disturbance

(22) The curling of the magnetic recording medium is evaluated as follows. A magnetic tape having a width of 1.27 cm which was produced from the below-mentioned composition, was placed on a flat plate to measure a floating height of opposite width ends thereof from the surface of the flat plate. The curling was evaluated by classifying the results into the following four ranks among which the rank A represents the most excellent condition where the curing was minimized.

A: Floating height of opposite width ends of the magnetic tape from the surface of the flat plate was less than 0.5 mm;

B: Floating height was not less than 0.5 mm and less than 1.0 mm;

C: Floating height was not less than 1.0 mm and less than 2.0 mm; and

D: Floating height was not less than 2.0 mm

(23) The thickness of each of the non-magnetic base film, the back coat layer and the magnetic recording layer constituting the magnetic recording medium was measured in the following manner by using "Digital Electronic Micrometer R351C" (manufactured by Anritsu Corp.)

The thickness (A) of a base film was first measured. Similarly, the thickness (B) (B=the sum of the thicknesses of the base film and the magnetic recording layer) of a magnetic recording film obtained by forming a magnetic recording layer on the one surface of the base film was measured. Furthermore, the thickness (C) (C=the sum of the thicknesses of the base film, the magnetic recording layer and the back coat layer) of a magnetic recording medium obtained by forming a back coat layer on the opposite surface of the base film was measured. The thickness of the magnetic recording layer is expressed by (B)–(A), and the thickness of the back coat layer is expressed by (C)–(B).

Alternatively, in case of a magnetic recording medium having a non-magnetic undercoat layer, the thickness of each of the non-magnetic base film, the back coat layer, the non-magnetic undercoat layer and the magnetic recording layer constituting the magnetic recording medium was measured in the following manner by using "Digital Electronic Micrometer R351C" (manufactured by Anritsu Corp.)

The thickness (A) of a base film was first measured. Similarly, the thickness (D) (D=the sum of the thicknesses of the base film and the non-magnetic undercoat layer) of a non-magnetic base film obtained by forming a non-magnetic undercoat layer on one surface of the base film was measured. Further, the thickness (E) (E=the sum of the thicknesses of the base film, the non-magnetic undercoat layer and the magnetic recording layer) of a magnetic recording medium obtained by forming a magnetic recording layer on the non-magnetic substrata was measured. Furthermore, the thickness (F) (F=the sum of the thicknesses of the base film, the non-magnetic undercoat layer, the magnetic recording layer and the back coat layer) of a magnetic recording film obtained by forming a back coat layer on the opposite surface of the base film was measured. The thickness of the non-magnetic undercoat layer is expressed by (D)–(A), the thickness of the magnetic recording layer is expressed by (E)–(D), and the thickness of the back coat layer is expressed by (F)–(E).

Example 1

20 kg of plate-shaped hematite particles (average plate diameter: 1.0 μm; average thickness: 0.053 μm; plate ratio: 18.9:1; geometrical standard deviation value: 1.46; BET specific surface area value: 21.6 m$^2$/g; Si content: 0.13% by weight (calculated as SiO$_2$) based on the weight of the particle; volume resistivity: 3.2×10$^8$ Ω·cm; myristic acid absorption: 0.68 mg/m$^2$), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the plate-shaped hematite particles.

Successively, the obtained slurry containing the plate-shaped hematite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the plate-shaped hematite particles were dispersed.

The particles in the obtained slurry which remained on a sieve of 325 meshes (mesh size: 44 μm) was 0%. The slurry was filtered and washed with water, thereby obtaining a filter cake containing the plate-shaped hematite particles. After the obtained filter cake containing the plate-shaped hematite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 294 N/cm (30 Kg/cm) and a stirring speed of 22 rpm for 30 minutes, thereby lightly deagglomerating the particles.

110 g of methyltriethoxysilane (tradename: "TSL8123", produced by GE TOSHIBA SILICONE CO., LTD.) was mixed and diluted with 200 ml of ethanol to obtain a methyltriethoxysilane solution. The methyltriethoxysilane solution was added to the deagglomerated plate-shaped hematite particles under the operation of the edge runner. The plate-shaped hematite particles were continuously mixed and stirred at a linear load of 294 N/cm (30 Kg/cm) and a stirring speed of 22 rpm for 30 minutes.

Next, 1,100 g of carbon black fine particles A (particle shape: granular shape; average particle size: 0.022 μm; geometrical standard deviation value: 1.68; BET specific surface area value: 134 m$^2$/g; blackness (L* value): 16.6; DBP oil absorption: 89 ml/100 g) were added to the plate-shaped hematite particles coated with methyltriethoxysilane for 10 minutes while operating the edge runner. Further, the mixed particles were continuously stirred at a linear load of 294 N/cm (30 Kg/cm) and a stirring speed of 22 rpm for 30 minutes to form the carbon black coat on the coating layer composed of methyltriethoxysilane, thereby obtaining plate-shaped non-magnetic composite particles.

The obtained plate-shaped non-magnetic composite particles were heat-treated at 105° C. for 60 minutes by using a drier. As shown in the electron micrograph, the resultant plate-shaped non-magnetic composite particles had an average plate diameter of 1.0 μm, an average thickness of 0.054 μm and a plate ratio of 18.5:1. In addition, the plate-shaped non-magnetic composite particles showed a geometrical standard deviation value of 1.46, a BET specific surface area value of 28.6 m$^2$/g, a volume resistivity of 5.6×10$^2$ Ω·cm and a myristic acid absorption of 0.21 mg/m$^2$. The desorption percentage of the carbon black from the plate-shaped non-magnetic composite particles was 6.8%. The amount of a coating organosilane compound produced from methyltriethoxysilane was 0.15% by weight (calculated as Si). The amount of the carbon black coat formed on the coating layer composed of the organosilane compound produced from methyltriethoxysilane is 9.05% by weight (calculated as C) based on the weight of the plate-shaped non-magnetic composite particles (corresponding to 10 parts by weight based on 100 parts by weight of the plate-shaped hematite particles). The thickness of the carbon black coat formed was 0.0025 μm. Since no carbon black was recognized on the electron photograph, it was confirmed that a whole amount of the carbon black used contributed to the formation of the carbon black coat on the coating layer composed of the organosilane compound produced from methyltriethoxysilane.

<Production of Back Coat Layer>

A back coat layer was formed on a non-magnetic base film by the method as described in detail below. Various properties of the thus formed back coat layer were evaluated by the above-described methods.

12 g of the plate-shaped non-magnetic composite particles were mixed with a binder resin solution (comprising 30% by weight of a vinyl chloride-vinyl acetate copolymer resin having a sodium sulfonate group and 70% by weight of cyclohexanone) and cyclohexanone, and the resultant mixture was kneaded for 30 minutes using a plast-mill.

Next, the obtained kneaded material was taken out and charged into a 140-ml glass bottle together with 95 g of 1.5 mmφ glass beads, an additional amount of a binder resin solution (comprising 30% by weight of a polyurethane resin having a sodium sulfonate group, 35% by weight of toluene and 35% by weight of methyl ethyl ketone), cyclohexanone, toluene and methyl ethyl ketone. The resultant mixture was mixed and dispersed for 6 hours using a paint shaker. Then, after adding a lubricant and a hardening agent, the mixture was further mixed and dispersed for 15 minutes using a paint shaker.

The obtained coating composition for back coat layer was as follows:

| | |
|---|---|
| Plate-shaped non-magnetic composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:2) | 3 parts by weight |
| Hardening agent (polyisocyanate) | 5 parts by weight |
| Cyclohexanone | 57.7 parts by weight |
| Methyl ethyl ketone | 144.2 parts by weight |
| Toluene | 86.5 parts by weight |

The viscosity of the obtained coating composition for back coat layer was 435 cP.

Next, one part of the obtained coating composition for back coat layer was applied onto a 12 μm-thick polyethylene terephthalate film using a slit coater and then dried, thereby forming a back coat layer.

The thus formed back coat layer had a thickness of 1.0 μm, a Young's modulus (relative value) of 11.3, a linear absorption of 2.36 μm$^{-1}$ and a surface resistivity value of 6.3×10$^4$ Ω/cm$^2$.

<Production of Magnetic Recording Medium>

100 parts by weight of Co-coated acicular magnetite particles (average major axial diameter: 0.22 μm, average minor axial diameter: 0.031 μm, aspect ratio: 7.1, geometrical standard deviation value: 1.45, BET specific surface area: 38.9 m$^2$/g, coercive force value: 60.5 kA/m (760 Oe), saturation magnetization value: 80.3 Am$^2$/kg (80.3 emu/g), Co content: 2.64 wt. %), 1.2 g of a polishing agent (AKP-50: trade name, produced by Sumitomo Chemical Co., Ltd.), 0.06 g of carbon black (#3050, trade name, produced by Mitsubishi Chemical Corp.), a binder resin solution (30% by weight of vinyl chloride-vinyl acetate copolymer resin having a sodium sulfonate group and 70% by weight of cyclohexanone) were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1: 1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Co-coated acicular magnetite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 10 parts by weight |
| Carbon black (#3050) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 64.9 parts by weight |
| Methyl ethyl ketone | 162.2 parts by weight |
| Toluene | 97.3 parts by weight |

The viscosity of the obtained magnetic coating composition was 2,304 cP.

The above magnetic coating composition was passed though a 1 μm-mesh filter, applied onto a 12 μm-thick polyethylene terephthalate film using a slit coater, and then dried, thereby forming a magnetic layer. The thus formed magnetic layer was subjected to calender treatment by an ordinary method to smoothen the surface thereof.

Next, the above coating composition for back coat layer was applied onto the surface of the non-magnetic base film opposite to its surface where the magnetic recording layer was already formed, and then dried, thereby forming a back coat layer.

Then, the thus obtained coated tape was cut into a width of 1.27 cm (½ inch), and then allowed to stand at 60° C for 24 hours in a curing oven for sufficiently curing the cut tape, thereby obtaining a magnetic tape. The thus obtained magnetic tape had a 3.4 μm-thick magnetic recording layer.

The coercive force value of the magnetic tape produced by forming a magnetic recording layer on the non-magnetic base film was 64.7 kA/m (813 Oe), the squareness (Br/Bm) thereof was 0.90, the gloss thereof was 188%, the surface roughness Ra thereof was 6.1 nm, and the linear absorption coefficient thereof was 2.66 μm$^{-1}$. Further, as to the durability of the magnetic tape, the running durability time was not less than 30 minutes, and the head contamination was A.

The drop-out performance of the magnetic tape was 6.3/msec; the winding non-uniformity thereof was rank A; and the curling thereof was rank A.

Core Particles 1 to 5:

Various plate-shaped hematite particles were prepared by known methods. The same procedure as defined in Example 1 was conducted by using the thus plate-shaped hematite particles, thereby obtaining deagglomerated plate-shaped hematite particles as core particles.

Various properties of the thus obtained plate-shaped hematite particles are shown in Table 1.

Core Particles 6:

The same procedure as defined in Example 1 was conducted by using 20 kg of the diaggregated plate-shaped hematite particles (core particles 1) and 150 liters of water, thereby obtaining a slurry containing the plate-shaped hematite particles. The pH value of the obtained re-dispersed slurry containing the plate-shaped hematite particles was adjusted to 10.5, and then the concentration of the solid content in the slurry was adjusted to 98 g/liter by adding water thereto. After 150 liters of the slurry was heated to 60° C., 5,444 ml of a 1.0 mol/liter NaAlO$_2$ solution (corresponding to 1.0% by weight (calculated as Al) based on the weight of the plate-shaped hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the plate-shaped hematite particles whose surface was coated with hydroxides of aluminum.

Main production conditions are shown in Table 2, and various properties of the obtained plate-shaped hematite particles are shown in Table 3.

Core Particles 7 to 10:

The same procedure as defined above for the production of the core particles 6, was conducted except that kinds of core particles and kinds and amounts of additives used in the above surface treatment were changed variously, thereby obtaining surface-treated plate-shaped hematite particles.

The essential treating conditions are shown in Table 2, and various properties of the obtained surface-treated plate-shaped hematite particles are shown in Table 3.

Examples 2 to 13 and Comparative Examples 1 to 3:

The same procedure as defined in Example 1 was conducted except that kinds of the core particles, addition or non-addition of alkoxysilane or polysiloxane, kinds and amounts of alkoxysilane or polysiloxane added, treating conditions of an edge runner used in the alkoxysilane-coating process or polysiloxane-coating process, kinds and amounts of the carbon black fine particles added, and treating conditions of an edge runner used in the process for forming the carbon black coat, were changed variously, thereby obtaining plate-shaped non-magnetic composite particles. As a result of the observation by an electron microscope, liberated carbon black were not recognized in the plate-shaped non-magnetic composite particles obtained in Examples 2 to 13. Therefore, it was confirmed that a substantially whole amount of the carbon black used in Examples 2 to 13 contributed to the formation of the carbon black coat on the coating layer composed of an organosilane compound produced from the alkoxysilane or polysiloxane.

Various properties of the carbon black fine particles A to F used, are shown in Table 4.

The essential treating conditions are shown in Table 5, and various properties of the obtained plate-shaped non-magnetic composite particles are shown in Table 6.

Meanwhile, all the additives used in Examples 9 to 11 were polysiloxanes. Specifically, "TSF484" (tradename, produced by GE Toshiba Silicone Co., Ltd.) was methyl hydrogen polysiloxane; "BYK-080" (tradename, produced by BYK-Chemie Japan Co., Ltd.) was modified polysiloxane; and "TSF-4770" (tradename, produced by GE Toshiba Silicone Co., Ltd.) was terminal carboxyl group-modified polysiloxane.

<Production of Back Coat Layer>

Back Coat Layers 1 to 21:

The same procedure for the production of back coat layer as defined in Example 1 was conducted except that kind of non-magnetic particles, addition or non-addition of carbon black fine particles and amount of carbon black fine particles added were varied, thereby forming a back coat layer. Various properties of the thus-formed back coat layer were evaluated according to the above-mentioned methods.

The production conditions for the back coat layer are shown in Table 7, and various properties of the obtained back coat layer are shown in Table 8.

Examples 14 to 25 and Comparative Examples 4 to 12:

<Production of Magnetic Recording Medium>

The same procedure for the production of magnetic recording medium as defined in Example 1 was conducted except that kind of back coat layer and kind of magnetic particles were varied, thereby obtaining a magnetic recording medium.

Various properties of magnetic particles 1 to 3 used are shown in Table 9.

Meanwhile, the magnetic particles 3 were plate-shaped magnetic particles, and in Table 9, the average major axis diameter, average minor axis diameter and aspect ratio thereof represent "average plate surface diameter", "average thickness" and "plate ratio", respectively.

The production conditions of magnetic recording media obtained in Examples 13 to 24 and Comparative Examples 4 to 12 are shown in Table 10, and various properties of the obtained magnetic recording media are shown in Tables 11 and 12.

<Production of Non-magnetic Undercoat Layer>

Non-magnetic Particles 1 to 6:

Various properties of non-magnetic particles produced by known methods are shown in Table 13.

Production of Non-magnetic Undercoat Layer 1

12 g of non-magnetic particles 1 shown in Table 13 below were mixed with a binder resin solution (containing 30% by weight of vinyl chloride-vinyl acetate copolymer resin having a sodium sulfonate group and 70% by weight of cyclohexanone) and cyclohexanone, thereby obtaining a mixture (solid content: 72%). The obtained mixture was further kneaded for 30 minutes using a plast-mill, thereby obtaining a kneaded material.

The thus obtained kneaded material was added to a 140 ml-glass bottle together with 95 g of 1.5 mmϕ glass beads, an additional amount of a binder resin solution (containing 30% by weight of polyurethane resin having a sodium sulfonate group and 70% by weight of a mixed solvent of methyl ethyl ketone and toluene (1:1)), cyclohexanone, methyl ethyl ketone and toluene. The resultant mixture was mixed and dispersed for 6 hours by a paint shaker, thereby obtaining a coating composition. Thereafter, a lubricant was added to the obtained coating composition, and the mixture was mixed and dispersed for 15 minutes by a paint shaker.

The composition of the obtained non-magnetic coating composition was as follows:

| | |
|---|---|
| Non-magnetic particles 1 | 100 parts by weight |
| Vinyl chloride-vinyl acetate copolymer resin having a sodium silfonate group | 10 parts by weight |
| Polyurethane resin having a sodium sulfonate group | 10 parts by weight |
| Lubricant (myristic acid: butyl stearate = 1:1) | 2 parts by weight |
| Cyclohexanone | 56.9 parts by weight |
| Methyl ethyl ketone | 142.3 parts by weight |
| Toluene | 85.4 parts by weight |

Next, the non-magnetic coating composition was coated on a 12 μm-thick polyethylene terephthalate film using a slit-coater so as to form a coating layer, and then dried, thereby producing a non-magnetic undercoat layer.

Main production conditions and various properties of the obtained non-magnetic undercoat layers are shown in Table 14.

Production of Non-magnetic Undercoat Layers 2 to 6:

Non-magnetic undercoat layers were produced using various non-magnetic particles by the same method as defined in Production of non-magnetic undercoat layer 1.

Main production conditions and various properties of the obtained non-magnetic undercoat layers are shown in Table 14.

<Production of Magnetic Recording Medium Having Non-magnetic Undercoat Layer>

Example 26

100 parts by weight of Co-coated acicular magnetite particles (average major axial diameter: 0.22 μm, average minor axial diameter: 0.031 μm, aspect ratio: 7.1, geometrical standard deviation value: 1.45, BET specific surface area: 38.9 m$^2$/g, coercive force value: 60.5 kA/m (760 Oe), saturation magnetization value: 80.3 Am$^2$/kg (80.3 emu/g), Co content: 2.64 wt. %), 1.2 g of a polishing agent (AKP-50: trade name, produced by Sumitomo Chemical Co., Ltd.), 0.06 g of carbon black (#3050, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmϕ glass beads, a binder resin solution (30% by weight of polyurethane resin having a sodium sulfonate group and 70% by weight of a solvent (methyl ethyl ketone:toluene=1: 1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Co-coated acicular magnetite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 10 parts by weight |
| Carbon black (#3050) | 1.0 parts by weight |
| Lubricant (myristic acid: butyl stearate = 1:2) | 3.0 parts by weight |
| Hardening agent (polyisocyanate) | 5.0 parts by weight |
| Cyclohexanone | 64.9 parts by weight |
| Methyl ethyl ketone | 162.2 parts by weight |
| Toluene | 97.3 parts by weight |

The viscosity of the obtained magnetic coating composition was 2,304 cP.

The obtained magnetic coating composition was passed through a 1 μm-mesh filter, applied on the undercoat layer 1 using a slit coater, magnetically oriented in magnetic field and then dried. Then, the surface of the resultant magnetic layer was smoothened by ordinary calender treatment.

Next, the coating composition for the back coat layer 1 was applied onto the surface opposite of the non-magnetic base film to its surface on which the magnetic recording layer was already formed, using a slit coater, and then dried, thereby forming a back coat layer.

Then, the thus obtained coated tape was cut into a width of 1.27 cm (½ inch), allowed to stand in a curing oven at 60° C for 24 hours for sufficiently curing the cut tape, thereby obtaining a magnetic tape.

Main production conditions are shown in Table 15, and various properties of the obtained magnetic recording media are shown in Table 16.

Examples 27 to 37 and Comparative Examples 13 to 21:

The same procedure as defined in Example 26 was conducted except that kind of back coat layer, kind of non-magnetic undercoat layer and kind of magnetic particles were varied, thereby obtaining magnetic recording media.

Production conditions of the magnetic recording media obtained in Examples 27 to 37 and Comparative Examples 13 to 21 are shown in Table 15, and various properties of the obtained magnetic recording media are shown in Tables 16 and 17.

TABLE 1

Properties of plate-shaped hematite particles

| Core particles | Kind | Particle shape | Average plate surface diameter (μm) | Average thickness (μm) | Plate ratio (-) | Geometrical standard deviation value (-) | BET specific surface area (m$^2$/g) | Si content (inside particles) (wt. %) | Volume resistivity value (Ω · cm) | Myristic acid absorption (mg/m$^2$) |
|---|---|---|---|---|---|---|---|---|---|---|
| Core particles 1 | Hematite particles | Plate-shaped | 1.02 | 0.022 | 46.4:1 | 1.48 | 18.6 | 0.13 | $3.9 \times 10^8$ | 0.66 |
| Core particles 2 | Hematite particles | Plate-shaped | 1.14 | 0.048 | 23.8:1 | 1.52 | 25.3 | 0.16 | $5.6 \times 10^8$ | 0.73 |
| Core particles 3 | Hematite particles | Plate-shaped | 0.66 | 0.019 | 34.7:1 | 1.54 | 46.8 | 0.09 | $1.4 \times 10^8$ | 0.71 |

TABLE 1-continued

Properties of plate-shaped hematite particles

| Core particles | Kind | Particle shape | Average plate surface diameter (μm) | Average thickness (μm) | Plate ratio (-) | Geometrical standard deviation value (-) | BET specific surface area (m²/g) | Si content (inside particles) (wt. %) | Volume resistivity value (Ω · cm) | Myristic acid absorption (mg/m²) |
|---|---|---|---|---|---|---|---|---|---|---|
| Core particles 4 | Hematite particles | Plate-shaped | 0.83 | 0.066 | 12.6:1 | 1.63 | 12.6 | 0.43 | $9.6 \times 10^7$ | 0.80 |
| Core particles 5 | Hematite particles | Plate-shaped | 1.41 | 0.059 | 23.9:1 | 1.52 | 21.2 | 0.24 | $6.4 \times 10^8$ | 0.68 |

TABLE 2

| Core particles | Kind of core particles | Surface-treatment step Additives | | | Surface-treatment step Coating material | | |
|---|---|---|---|---|---|---|---|
| | | Kind | Calculated as | Amount (wt. %) | Kind | Calculated as | Amount (wt. %) |
| Core particles 6 | Core particles 1 | Sodium aluminate | Al | 1.0 | A | Al | 0.98 |
| Core particles 7 | Core particles 2 | Water glass #3 | SiO₂ | 0.5 | S | SiO₂ | 0.49 |
| Core particles 8 | Core particles 3 | Aluminum sulfate | Al | 2.0 | A | Al | 1.93 |
| | | Water glass #3 | SiO₂ | 1.0 | S | SiO₂ | 0.96 |
| Core particles 9 | Core particles 4 | Sodium aluminate | Al | 2.0 | A | Al | 1.93 |
| Core particles 10 | Core particles 5 | Aluminum sulfate | Al | 5.0 | A | Al | 4.78 |

TABLE 3

Properties of surface-treated plate-shaped hematite particles

| Core particles | Average plate surface diameter (μm) | Average thickness (μm) | Plate ratio (-) | Geometrical standard deviation value (-) | BET specific surface area (m²/g) | Si content (inside particles) (wt. %) | Volume resistivity value (Ω · cm) | Myristic acid absorption (mg/m²) |
|---|---|---|---|---|---|---|---|---|
| Core particles 6 | 1.02 | 0.022 | 46.4:1 | 1.48 | 18.9 | 0.13 | $5.6 \times 10^8$ | 0.68 |
| Core particles 7 | 1.14 | 0.049 | 23.3:1 | 1.52 | 25.6 | 0.16 | $6.9 \times 10^8$ | 0.63 |
| Core particles 8 | 0.67 | 0.019 | 35.5:1 | 1.54 | 45.9 | 0.09 | $2.3 \times 10^8$ | 0.62 |
| Core particles 9 | 0.83 | 0.066 | 12.6:1 | 1.63 | 13.1 | 0.43 | $1.6 \times 10^8$ | 0.78 |
| Core particles 10 | 1.42 | 0.060 | 23.7:1 | 1.52 | 20.8 | 0.24 | $9.8 \times 10^8$ | 0.65 |

TABLE 4

Properties of carbon black fine particles

| Kind of carbon black fine particles | Particle shape | Average particle size (μm) | Geometrical standard deviation value (-) | BET specific surface area (m²/g) | DBP oil absorption (ml/100 g) | Blackness (L* value) (-) |
|---|---|---|---|---|---|---|
| Carbon black A | Granular | 0.022 | 1.68 | 134.0 | 89 | 16.6 |
| Carbon black B | Granular | 0.022 | 1.78 | 133.5 | 84 | 14.6 |
| Carbon black C | Granular | 0.015 | 1.56 | 265.3 | 57 | 15.2 |
| Carbon black D | Granular | 0.030 | 2.06 | 84.6 | 95 | 17.0 |
| Carbon black E | Granular | 0.024 | 1.69 | 113.6 | 102 | 16.2 |
| Carbon black F | Granular | 0.028 | 1.71 | 800.0 | 200 | 15.3 |

TABLE 5

Production of plate-shaped non-magnetic composite particles

| Examples and Comparative Examples | Kind of core particles | Coating with alkoxysilanes or polysiloxanes | | | | | Coating amount (calculated as Si) (wt. %) | Adhesion step with carbon black | | | | | Amount adhered (calculated as C) (wt. %) |
|---|---|---|---|---|---|---|---|---|---|---|---|---|---|
| | | Additives | | Edge runner treatment | | | | Carbon black | | Edge runner treatment | | | |
| | | Kind | Amount added (part by weight) | Linear load (N/cm) | Linear load (Kg/cm) | Time (min.) | | Kind | Amount adhered (weight part) | Linear load (N/cm) | Linear load (Kg/cm) | Time (min) | |
| Example 2 | Core particles 1 | Methyl triethoxysilane | 1.0 | 294 | 30 | 20 | 0.15 | A | 10.0 | 294 | 30 | 20 | 9.11 |
| Example 3 | Core particles 2 | Methyl tri-methoxysilane | 0.5 | 343 | 35 | 30 | 0.10 | A | 15.0 | 294 | 30 | 20 | 13.03 |
| Example 4 | Core particles 3 | Dimethyl di-methoxysilane | 1.0 | 245 | 25 | 20 | 0.22 | B | 17.0 | 245 | 25 | 30 | 14.53 |
| Example 5 | Core particles 4 | Phenyl triethoxysilane | 2.0 | 294 | 30 | 30 | 0.27 | B | 10.0 | 245 | 25 | 20 | 9.05 |
| Example 6 | Core particles 5 | Isobutyl tri-methoxysilane | 0.75 | 294 | 30 | 20 | 0.11 | C | 20.0 | 343 | 35 | 30 | 16.60 |
| Example 7 | Core particles 6 | Methyl triethoxysilane | 1.0 | 343 | 35 | 20 | 0.15 | C | 15.0 | 343 | 35 | 30 | 13.00 |
| Example 8 | Core particles 7 | Methyl tri-methoxysilane | 1.0 | 245 | 25 | 15 | 0.19 | D | 12.5 | 294 | 30 | 20 | 11.08 |
| Example 9 | Core particles 8 | TSF484 | 0.5 | 294 | 30 | 20 | 0.22 | D | 10.0 | 294 | 30 | 30 | 9.06 |
| Example 10 | Core particles 9 | BYK-080 | 0.5 | 294 | 30 | 20 | 0.09 | B | 7.5 | 245 | 25 | 30 | 4.78 |
| Example 11 | Core particles 10 | TSF4770 | 1.0 | 245 | 25 | 20 | 0.34 | B | 7.5 | 343 | 35 | 20 | 6.92 |
| Example 12 | Core particles 1 | Methyl triethoxysilane | 0.5 | 343 | 35 | 15 | 0.08 | E | 10.0 | 245 | 25 | 20 | 9.09 |
| Example 13 | Core particles 1 | Methyl triethoxysilane | 1.0 | 245 | 25 | 20 | 0.15 | F | 15.0 | 294 | 30 | 20 | 13.00 |
| Comparative Example 1 | Core particles 1 | — | — | — | — | — | — | B | 15.0 | 294 | 30 | 20 | 13.01 |
| Comparative Example 2 | Core particles 1 | Methyl triethoxysilane | 0.005 | 294 | 30 | 20 | $7 \times 10^{-4}$ | C | 15.0 | 294 | 30 | 20 | 13.00 |
| Comparative Example 3 | Core particles 1 | Methyl triethoxysilane | 1.0 | 294 | 30 | 20 | 0.15 | D | 35.0 | 294 | 30 | 20 | 25.88 |

TABLE 6

Properties of plate-shaped non-magnetic composite particles

| Examples and Comparative Examples | Average plate surface diameter ($\mu m$) | Average thickness ($\mu m$) | Plate ratio (-) | Geometrical standard deviation value (-) | BET specific surface area ($m^2/g$) | Si content (inside particles) (wt. %) | Volume resistivity value ($\Omega \cdot cm$) | Thickness of carbon black layer adhered ($\mu m$) | Myristic acid absorption ($mg/m^2$) | Carbon black desorption percentage (%) |
|---|---|---|---|---|---|---|---|---|---|---|
| Example 2 | 1.02 | 0.023 | 44.3:1 | 1.48 | 21.2 | 0.13 | $3.6 \times 10^2$ | 0.0023 | 0.28 | 7.6 |
| Example 3 | 1.15 | 0.049 | 23.5:1 | 1.52 | 31.8 | 0.16 | $6.4 \times 10^2$ | 0.0025 | 0.23 | 8.3 |
| Example 4 | 0.67 | 0.020 | 33.5:1 | 1.54 | 49.6 | 0.09 | $9.6 \times 10^2$ | 0.0026 | 0.25 | 8.2 |
| Example 5 | 0.83 | 0.067 | 12.4:1 | 1.63 | 14.8 | 0.43 | $6.3 \times 10^2$ | 0.0022 | 0.23 | 7.3 |
| Example 6 | 1.42 | 0.061 | 23.3:1 | 1.52 | 28.6 | 0.24 | $8.3 \times 10^2$ | 0.0027 | 0.21 | 8.5 |
| Example 7 | 1.03 | 0.023 | 44.8:1 | 1.48 | 22.6 | 0.13 | $2.6 \times 10^2$ | 0.0025 | 0.26 | 4.5 |
| Example 8 | 1.14 | 0.050 | 22.8:1 | 1.52 | 30.3 | 0.16 | $5.1 \times 10^2$ | 0.0024 | 0.24 | 4.2 |
| Example 9 | 0.67 | 0.020 | 33.5:1 | 1.54 | 49.1 | 0.09 | $3.8 \times 10^2$ | 0.0024 | 0.23 | 3.8 |
| Example 10 | 0.83 | 0.067 | 12.4:1 | 1.63 | 14.1 | 0.43 | $6.4 \times 10^2$ | 0.0022 | 0.24 | 3.9 |
| Example 11 | 1.42 | 0.061 | 23.3:1 | 1.52 | 24.3 | 0.24 | $5.6 \times 10^2$ | 0.0023 | 0.21 | 3.5 |
| Example 12 | 1.02 | 0.023 | 44.3:1 | 1.48 | 21.6 | 0.13 | $2.3 \times 10^2$ | 0.0024 | 0.26 | 9.8 |
| Example 13 | 1.03 | 0.024 | 42.9:1 | 1.48 | 22.9 | 0.13 | $1.8 \times 10^2$ | 0.0026 | 0.28 | 9.6 |
| Comparative Example 1 | 1.02 | 0.022 | 46.4:1 | — | 30.6 | 0.13 | $4.6 \times 10^7$ | — | 0.63 | 66.3 |

TABLE 6-continued

| | Properties of plate-shaped non-magnetic composite particles | | | | | | | | | |
|---|---|---|---|---|---|---|---|---|---|---|
| Examples and Comparative Examples | Average plate surface diameter (μm) | Average thickness (μm) | Plate ratio (−) | Geometrical standard deviation value (−) | BET specific surface area (m²/g) | Si content (inside particles) (wt. %) | Volume resistivity value (Ω · cm) | Thickness of carbon black layer adhered (μm) | Myristic acid absorption (mg/m²) | Carbon black desorption percentage (%) |
| Comparative Example 2 | 1.02 | 0.022 | 46.4:1 | — | 30.0 | 0.13 | $7.4 \times 10^5$ | — | 0.58 | 56.8 |
| Comparative Example 3 | 1.02 | 0.026 | 39.2:1 | — | 32.1 | 0.13 | $6.1 \times 10^5$ | — | 0.51 | 24.6 |

TABLE 7

| | Production of coating composition for back coat layer | |
|---|---|---|
| Back coat layer | Kind of back coat material | Weight ratio of particles to resin (−) |
| Back coat layer 1 | Example 2 | 5.0 |
| Back coat layer 2 | Example 3 | 5.0 |
| Back coat layer 3 | Example 4 | 5.0 |
| Back coat layer 4 | Example 5 | 5.0 |
| Back coat layer 5 | Example 6 | 5.0 |
| Back coat layer 6 | Example 7 | 5.0 |
| Back coat layer 7 | Example 8 | 5.0 |
| Back coat layer 8 | Example 9 | 5.0 |
| Back coat layer 9 | Example 10 | 5.0 |
| Back coat layer 10 | Example 11 | 5.0 |
| Back coat layer 11 | Example 12 | 5.0 |
| Back coat layer 12 | Example 13 | 5.0 |
| Back coat layer 13 | Carbon black A | 5.0 |
| Back coat layer 14 | Core particles 1 | 5.0 |
| Back coat layer 15 | Core particles 2 | 5.0 |
| Back coat layer 16 | Core particles 3 | 5.0 |
| Back coat layer 17 | Core particles 4 | 5.0 |
| Back coat layer 18 | Core particles 5 | 5.0 |
| Back coat layer 19 | Comparative Example 1 | 5.0 |
| Back coat layer 20 | Comparative Example 2 | 5.0 |
| Back coat layer 21 | Comparative Example 3 | 5.0 |

| Back coat layer | Production of coating composition for back coat layer Amount of carbon black added (−) | Properties of coating composition Viscosity (cP) |
|---|---|---|
| Back coat layer 1 | — | 256 |
| Back coat layer 2 | — | 384 |
| Back coat layer 3 | — | 384 |
| Back coat layer 4 | — | 410 |
| Back coat layer 5 | — | 278 |
| Back coat layer 6 | — | 435 |
| Back coat layer 7 | — | 512 |
| Back coat layer 8 | — | 384 |
| Back coat layer 9 | — | 333 |
| Back coat layer 10 | — | 307 |
| Back coat layer 11 | — | 640 |
| Back coat layer 12 | — | 768 |
| Back coat layer 13 | — | 25,600 |
| Back coat layer 14 | 10.0 | 7,682 |
| Back coat layer 15 | 10.0 | 9,232 |
| Back coat layer 16 | 10.0 | 8,302 |
| Back coat layer 17 | 10.0 | 6,400 |
| Back coat layer 18 | 10.0 | 256 |
| Back coat layer 19 | — | 278 |
| Back coat layer 20 | — | 3,387 |
| Back coat layer 21 | — | 2,560 |

TABLE 8

| | Properties of back coat layer | |
|---|---|---|
| Back coat layer | Thickness (μm) | Young's modulus (relative value) |
| Back coat layer 1 | 1.1 | 113 |
| Back coat layer 2 | 1.1 | 114 |
| Back coat layer 3 | 1.0 | 110 |
| Back coat layer 4 | 1.1 | 108 |
| Back coat layer 5 | 1.0 | 109 |
| Back coat layer 6 | 1.1 | 112 |
| Back coat layer 7 | 1.1 | 114 |
| Back coat layer 8 | 1.0 | 115 |
| Back coat layer 9 | 1.0 | 121 |
| Back coat layer 10 | 1.1 | 120 |
| Back coat layer 11 | 1.0 | 104 |
| Back coat layer 12 | 1.0 | 103 |
| Back coat layer 13 | 1.1 | 31 |
| Back coat layer 14 | 1.1 | 68 |
| Back coat layer 15 | 1.0 | 68 |
| Back coat layer 16 | 1.0 | 71 |
| Back coat layer 17 | 1.1 | 63 |
| Back coat layer 18 | 1.0 | 73 |
| Back coat layer 19 | 1.0 | 89 |
| Back coat layer 20 | 1.0 | 50 |
| Back coat layer 21 | 1.0 | 46 |

| | Properties of back coat layer | |
|---|---|---|
| Back coat layer | Linear absorption (μm⁻¹) | Surface resistivity value (Ω/cm²) |
| Back coat layer 1 | 2.38 | $1.8 \times 10^5$ |
| Back coat layer 2 | 2.18 | $6.5 \times 10^4$ |
| Back coat layer 3 | 2.11 | $2.3 \times 10^5$ |
| Back coat layer 4 | 2.34 | $6.3 \times 10^4$ |
| Back coat layer 5 | 2.12 | $8.1 \times 10^4$ |
| Back coat layer 6 | 2.12 | $2.2 \times 10^5$ |
| Back coat layer 7 | 2.06 | $1.6 \times 10^5$ |
| Back coat layer 8 | 2.13 | $3.8 \times 10^5$ |
| Back coat layer 9 | 2.22 | $4.1 \times 10^5$ |
| Back coat layer 10 | 2.31 | $6.1 \times 10^4$ |
| Back coat layer 11 | 1.99 | $5.8 \times 10^5$ |
| Back coat layer 12 | 1.96 | $6.4 \times 10^5$ |
| Back coat layer 13 | 1.33 | $3.2 \times 10^3$ |
| Back coat layer 14 | 1.76 | $6.6 \times 10^7$ |
| Back coat layer 15 | 1.68 | $9.3 \times 10^7$ |
| Back coat layer 16 | 1.56 | $8.2 \times 10^7$ |
| Back coat layer 17 | 1.63 | $7.6 \times 10^7$ |
| Back coat layer 18 | 1.68 | $9.1 \times 10^7$ |
| Back coat layer 19 | 1.43 | $3.6 \times 10^{13}$ |

TABLE 8-continued

| | | |
|---|---|---|
| Back coat layer 20 | 1.52 | $1.4 \times 10^{11}$ |
| Back coat layer 21 | 1.61 | $4.3 \times 10^{8}$ |

TABLE 9

| Magnetic particles | Kind of magnetic particles | Properties of magnetic particles Particle shape |
|---|---|---|
| Magnetic particles 1 | Co-coated magnetite particles (Co content: 2.64 wt %; $Fe^{2+}$ content: 15.8 wt %) | Acicular |
| Magnetic particles 2 | Magnetic metal particles containing iron as a main component (Al content: 2.11 wt %; Co content: 5.53 wt %) | Spindle-shaped |
| Magnetic particles 3 | Barium ferrite particles (Ti/Fe 1.6 mol %; Ni/Fe = 2.9 mol %) | Plate-shaped |

| | Properties of magnetic particles | | |
|---|---|---|---|
| Magnetic particles | Average major axis diameter (μm) | Average minor axis diameter (μm) | Aspect ratio (plate ratio) (-) |
| Magnetic particles 1 | 0.20 | 0.029 | 6.9:1 |
| Magnetic particles 2 | 0.15 | 0.019 | 7.9:1 |
| Magnetic particles 3 | 0.07 | 0.014 | 5.0:1 |

| | Properties of magnetic particles | |
|---|---|---|
| Magnetic particles | Geometrical standard deviation value (-) | BET specific surface area value (m²/g) |
| Magnetic particles 1 | 1.44 | 38.3 |
| Magnetic particles 2 | 1.41 | 51.2 |
| Magnetic particles 3 | 1.36 | 55.1 |

| | Properties of magnetic particles | | | |
|---|---|---|---|---|
| | Coercive force value | | Saturation magnetization value | |
| Magnetic particles | (kA/m) | (Oe) | (Am²/kg) | (emu/g) |
| Magnetic particles 1 | 72.4 | 910 | 81.3 | 81.3 |
| Magnetic particles 2 | 144.0 | 1,810 | 136.5 | 136.5 |
| Magnetic particles 3 | 180.5 | 2,268 | 56.3 | 56.3 |

TABLE 10

| Examples and Comparative Examples | Back coat layer Kind |
|---|---|
| Example 14 | Back coat layer 1 |
| Example 15 | Back coat layer 2 |
| Example 16 | Back coat layer 3 |
| Example 17 | Back coat layer 4 |
| Example 18 | Back coat layer 5 |
| Example 19 | Back coat layer 6 |
| Example 20 | Back coat layer 7 |
| Example 21 | Back coat layer 8 |
| Example 22 | Back coat layer 9 |
| Example 23 | Back coat layer 10 |
| Example 24 | Back coat layer 11 |
| Example 25 | Back coat layer 12 |
| Comparative Example 4 | Back coat layer 13 |
| Comparative Example 5 | Back coat layer 14 |
| Comparative Example 6 | Back coat layer 15 |
| Comparative Example 7 | Back coat layer 16 |
| Comparative Example 8 | Back coat layer 17 |
| Comparative Example 9 | Back coat layer 18 |
| Comparative Example 10 | Back coat layer 19 |
| Comparative Example 11 | Back coat layer 20 |
| Comparative Example 12 | Back coat layer 21 |

| | Magnetic particles | | Properties of magnetic coating composition |
|---|---|---|---|
| Examples and Comparative Examples | Kind | Amount blended (weight part) | Viscosity (cP) |
| Example 14 | Magnetic particles 1 | 100.0 | 3,230 |
| Example 15 | Magnetic particles 2 | 100.0 | 5,686 |
| Example 16 | Magnetic particles 3 | 100.0 | 4,680 |
| Example 17 | Magnetic particles 1 | 100.0 | 2,846 |
| Example 18 | Magnetic particles 2 | 100.0 | 7,650 |
| Example 19 | Magnetic particles 3 | 100.0 | 5,120 |
| Example 20 | Magnetic particles 1 | 100.0 | 2,668 |
| Example 21 | Magnetic particles 2 | 100.0 | 8,329 |
| Example 22 | Magnetic particles 3 | 100.0 | 4,820 |
| Example 23 | Magnetic particles 1 | 100.0 | 2,782 |
| Example 24 | Magnetic particles 2 | 100.0 | 7,868 |
| Example 25 | Magnetic particles 3 | 100.0 | 5,680 |
| Comparative Example 4 | Magnetic particles 1 | 100.0 | 3,103 |
| comparative Example 5 | Magnetic particles 1 | 100.0 | 3,326 |
| Comparative Example 6 | Magnetic particles 1 | 100.0 | 3,463 |
| Comparative Example 7 | Magnetic particles 1 | 100.0 | 3,386 |
| Comparative Example 8 | Magnetic particles 1 | 100.0 | 2,887 |
| Comparative Example 9 | Magnetic particles 1 | 100.0 | 2,896 |
| Comparative Example 10 | Magnetic particles 1 | 100.0 | 3,303 |
| Comparative Example 11 | Magnetic particles 1 | 100.0 | 3,204 |
| Comparative Example 12 | Magnetic particles 1 | 100.0 | 2,916 |

TABLE 11

| | Properties of magnetic recording medium | | |
|---|---|---|---|
| | Coercive force value | | Squareness |
| Examples | (kA/m) | (Oe) | (-) |
| Example 14 | 76.5 | 961 | 0.89 |
| Example 15 | 152.8 | 1,920 | 0.88 |

TABLE 11-continued

| Examples | | | |
|---|---|---|---|
| Example 16 | 184.0 | 2,312 | 0.87 |
| Example 17 | 78.2 | 983 | 0.90 |
| Example 18 | 149.6 | 1,880 | 0.90 |
| Example 19 | 182.7 | 2,296 | 0.89 |
| Example 20 | 77.7 | 976 | 0.91 |
| Example 21 | 144.5 | 1,816 | 0.89 |
| Example 22 | 180.9 | 2,273 | 0.87 |
| Example 23 | 78.1 | 981 | 0.92 |
| Example 24 | 152.9 | 1,921 | 0.86 |
| Example 25 | 182.2 | 2,289 | 0.86 |

| | Properties of magnetic recording medium | | |
|---|---|---|---|
| Examples | Gloss (%) | Surface roughness Ra (nm) | Linear absorption ($\mu m^{-1}$) |
| Example 14 | 181 | 8.0 | 2.83 |
| Example 15 | 207 | 7.5 | 2.96 |
| Example 16 | 198 | 9.1 | 2.82 |
| Example 17 | 182 | 7.9 | 2.68 |
| Example 18 | 208 | 7.4 | 2.65 |
| Example 19 | 201 | 8.8 | 2.65 |
| Example 20 | 189 | 7.7 | 2.98 |
| Example 21 | 216 | 7.2 | 2.93 |
| Example 22 | 203 | 8.4 | 2.85 |
| Example 23 | 189 | 7.6 | 2.98 |
| Example 24 | 206 | 7.5 | 2.63 |
| Example 25 | 203 | 8.6 | 2.65 |

| | Properties of magnetic recording medium Durability | |
|---|---|---|
| Examples | Running durability time (min) | Head contamination |
| Example 14 | ≧30 | A |
| Example 15 | 28.9 | A |
| Example 16 | 27.3 | A |
| Example 17 | ≧30 | A |
| Example 18 | ≧30 | A |
| Example 19 | 27.8 | A |
| Example 20 | ≧30 | A |
| Example 21 | ≧30 | A |
| Example 22 | ≧30 | A |
| Example 23 | ≧30 | A |
| Example 24 | 26.8 | B |
| Example 25 | 25.9 | B |

| | Properties of magnetic recording medium | | |
|---|---|---|---|
| Examples | Drop-out performance (D/O) (number/msec) | Winding non-uniformity (-) | Curling (-) |
| Example 14 | 6.4 | A | A |
| Example 15 | 6.3 | B | A |
| Example 16 | 7.3 | B | B |
| Example 17 | 6.1 | A | A |
| Example 18 | 6.4 | A | A |
| Example 19 | 4.8 | B | B |
| Example 20 | 4.3 | A | A |
| Example 21 | 3.2 | A | A |
| Example 22 | 2.6 | B | B |
| Example 23 | 3.2 | A | A |
| Example 24 | 9.6 | A | B |
| Example 25 | 9.2 | B | B |

TABLE 12

| | Properties of magnetic recording medium | | |
|---|---|---|---|
| Comparative Examples | Coercive force value (kA/m) | (Oe) | Squareness (-) |
| Comparative Example 4 | 758.4 | 953 | 0.89 |
| Comparative Example 5 | 760.8 | 956 | 0.89 |
| Comparative Example 6 | 761.6 | 957 | 0.90 |
| Comparative Example 7 | 759.2 | 954 | 0.89 |
| Comparative Example 8 | 756.8 | 951 | 0.90 |
| Comparative Example 9 | 757.6 | 952 | 0.90 |
| Comparative Example 10 | 758.4 | 953 | 0.90 |
| Comparative Example 11 | 760.8 | 956 | 0.90 |
| Comparative Example 12 | 760.8 | 956 | 0.90 |

| | Properties of magnetic recording medium | | |
|---|---|---|---|
| Comparative Examples | Gloss (%) | Surface roughness Ra (nm) | Linear absorption ($\mu m^{-1}$) |
| Comparative Example 4 | 181 | 8.6 | 2.16 |
| Comparative Example 5 | 179 | 8.1 | 2.33 |
| Comparative Example 6 | 182 | 8.2 | 2.38 |
| Comparative Example 7 | 182 | 8.3 | 2.36 |
| Comparative Example 8 | 183 | 8.1 | 2.32 |
| Comparative Example 9 | 184 | 8.2 | 2.31 |
| Comparative Example 10 | 181 | 8.4 | 2.23 |
| Comparative Example 11 | 181 | 8.6 | 2.38 |
| Comparative Example 12 | 182 | 8.0 | 2.56 |

| | Properties of magnetic recording medium Durability | |
|---|---|---|
| Comparative Examples | Running durability time (min) | Head contamination |
| Comparative Example 4 | 15.6 | D |
| Comparative Example 5 | 19.6 | C |
| Comparative Example 6 | 18.3 | C |
| Comparative Example 7 | 19.1 | C |
| Comparative Example 8 | 18.6 | C |
| Comparative Example 9 | 19.2 | C |
| Comparative Example 10 | 20.6 | C |
| Comparative Example 11 | 20.1 | D |
| Comparative Example 12 | 19.9 | D |

TABLE 12-continued

Properties of magnetic recording medium

| Comparative Examples | Drop-out performance (D/O) (number/msec) | Winding non-uniformity (-) | Curling (-) |
|---|---|---|---|
| Comparative Example 4 | 42.6 | D | C |
| Comparative Example 5 | 21.3 | C | C |
| Comparative Example 6 | 22.1 | C | C |
| Comparative Example 7 | 25.6 | C | C |
| Comparative Example 8 | 21.8 | C | C |
| Comparative Example 9 | 22.4 | C | C |
| Comparative Example 10 | 24.1 | D | C |
| Comparative Example 11 | 22.1 | D | D |
| Comparative Example 12 | 20.1 | D | D |

TABLE 13

| Kind of non-magnetic particles | Properties of non-magnetic particles for non-magnetic undercoat layer | |
|---|---|---|
| | Kind | Particle shape |
| Non-magnetic particles 1 | Hematite particles | Spindle-shaped |
| Non-magnetic particles 2 | Goethite particles | Acicular |
| Non-magnetic particles 3 | Hematite particles | Acicular |
| Non-magnetic particles 4 | Hematite particles | Acicular |
| Non-magnetic particles 5 | Hematite particles | Acicular |
| Non-magnetic particles 6 | Goethite particles | Acicular |

| Kind of non-magnetic particles | Properties of non-magnetic particles for non-magnetic undercoat layer | | | |
|---|---|---|---|---|
| | Average major axis diameter (μm) | Average minor axis diameter (μm) | Aspect ratio (-) | Geometrical standard deviation value (-) |
| Non-magnetic particles 1 | 0.187 | 0.0240 | 7.8:1 | 1.33 |
| Non-magnetic particles 2 | 0.240 | 0.0272 | 8.8:1 | 1.37 |
| Non-magnetic particles 3 | 0.143 | 0.0210 | 6.8:1 | 1.37 |
| Non-magnetic particles 4 | 0.115 | 0.0179 | 6.4:1 | 1.35 |
| Non-magnetic particles 5 | 0.143 | 0.0211 | 6.8:1 | 1.37 |
| Non-magnetic particles 6 | 0.240 | 0.0273 | 8.8:1 | 1.35 |

| Kind of non-magnetic particles | Properties of non-magnetic particles non-magnetic undercoat layer | | |
|---|---|---|---|
| | BET specific surface area value (m²/g) | Coating amount of Al (wt. %) | Al content (wt. %) |
| Non-magnetic particles 1 | 43.3 | — | — |
| Non-magnetic particles 2 | 86.3 | — | — |
| Non-magnetic particles 3 | 54.9 | 0.98 | — |
| Non-magnetic particles 4 | 58.3 | — | 0.67 |
| Non-magnetic particles 5 | 55.6 | — | — |
| Non-magnetic particles 6 | 88.1 | — | — |

| Kind of non-magnetic particles | Properties of non-magnetic particles for non-magnetic undercoat layer | | |
|---|---|---|---|
| | Amount of carbon black adhered (calculated as C) (wt. %) | Volume resistivity value (Ω·cm) | Black-ness (L* value) (-) |
| Non-magnetic particles 1 | — | $8.6 \times 10^8$ | 32.6 |
| Non-magnetic particles 2 | — | $9.6 \times 10^7$ | 34.6 |
| Non-magnetic particles 3 | — | $4.6 \times 10^8$ | 28.4 |
| Non-magnetic particles 4 | — | $3.2 \times 10^8$ | 29.6 |
| Non-magnetic particles 5 | 4.75 | $3.6 \times 10^4$ | 18.5 |
| Non-magnetic particles 6 | 4.81 | $5.8 \times 10^3$ | 20.3 |

TABLE 14

| Undercoat layer | Production of non-magnetic coating composition | | Properties of coating composition Viscosity (cP) |
|---|---|---|---|
| | Kind of non-magnetic particles | Weight ratio of particles to resin (-) | |
| Undercoat layer 1 | Non-magnetic particles 1 | 5.0 | 315 |
| Undercoat layer 2 | Non-magnetic particles 2 | 5.0 | 1,139 |
| Undercoat layer 3 | Non-magnetic particles 3 | 5.0 | 448 |
| Undercoat layer 4 | Non-magnetic particles 4 | 5.0 | 403 |
| Undercoat layer 5 | Non-magnetic particles 5 | 5.0 | 399 |
| Undercoat layer 6 | Non-magnetic particles 6 | 5.0 | 1,336 |

TABLE 14-continued

| | Properties of non-magnetic undercoat layer | | | |
|---|---|---|---|---|
| Undercoat layer | Thickness (μm) | Gloss (%) | Surface roughness Ra (nm) | Young's modulus (relative value) |
| Undercoat layer 1 | 3.4 | 191 | 8.2 | 124 |
| Undercoat layer 2 | 3.5 | 180 | 12.0 | 125 |
| Undercoat layer 3 | 3.4 | 205 | 6.3 | 126 |
| Undercoat layer 4 | 3.4 | 211 | 6.2 | 125 |
| Undercoat layer 5 | 3.4 | 199 | 7.1 | 125 |
| Undercoat layer 6 | 3.5 | 185 | 9.0 | 129 |

| | Properties of non-magnetic undercoat layer | |
|---|---|---|
| Undercoat layer | Linear absorption ($\mu m^{-1}$) | Surface resistivity value ($\Omega/cm^2$) |
| Undercoat layer 1 | 1.03 | $1.5 \times 10^{14}$ |
| Undercoat layer 2 | 0.79 | $2.1 \times 10^{13}$ |
| Undercoat layer 3 | 1.01 | $3.5 \times 10^{13}$ |
| Undercoat layer 4 | 0.98 | $3.6 \times 10^{13}$ |
| Undercoat layer 5 | 1.52 | $4.1 \times 10^{9}$ |
| Undercoat layer 6 | 1.46 | $2.3 \times 10^{10}$ |

TABLE 15

| Examples and Comparative Examples | Back coat layer Kind | Undercoat layer Kind |
|---|---|---|
| Example 26 | Back coat layer 1 | Undercoat layer 1 |
| Example 27 | Back coat layer 2 | Undercoat layer 2 |
| Example 28 | Back coat layer 3 | Undercoat layer 3 |
| Example 29 | Back coat layer 4 | Undercoat layer 4 |
| Example 30 | Back coat layer 5 | Undercoat layer 5 |
| Example 31 | Back coat layer 6 | Undercoat layer 6 |
| Example 32 | Back coat layer 7 | Undercoat layer 1 |
| Example 33 | Back coat layer 8 | Undercoat layer 2 |
| Example 34 | Back coat layer 9 | Undercoat layer 3 |
| Example 35 | Back coat layer 10 | Undercoat layer 4 |
| Example 36 | Back coat layer 11 | Undercoat layer 5 |
| Example 37 | Back coat layer 12 | Undercoat layer 6 |
| Comparative Example 13 | Back coat layer 13 | Undercoat layer 1 |
| Comparative Example 14 | Back coat layer 14 | Undercoat layer 1 |
| Comparative Example 15 | Back coat layer 15 | Undercoat layer 1 |
| Comparative Example 16 | Back coat layer 16 | Undercoat layer 1 |
| Comparative Example 17 | Back coat layer 17 | Undercoat layer 1 |
| Comparative Example 18 | Back coat layer 18 | Undercoat layer 1 |
| Comparative Example 19 | Back coat layer 19 | Undercoat layer 1 |
| Comparative Example 20 | Back coat layer 20 | Undercoat layer 1 |
| Comparative Example 21 | Back coat layer 21 | Undercoat layer 1 |

TABLE 15-continued

| | Magnetic particles | | Properties of magnetic coating composition |
|---|---|---|---|
| Examples and Comparative Examples | Kind | Amount blended (weight part) | Viscosity (cP) |
| Example 26 | Magnetic particles 1 | 100.0 | 2,870 |
| Example 27 | Magnetic particles 1 | 100.0 | 2,769 |
| Example 28 | Magnetic particles 1 | 100.0 | 2,912 |
| Example 29 | Magnetic particles 1 | 100.0 | 2,202 |
| Example 30 | Magnetic particles 2 | 100.0 | 7,863 |
| Example 31 | Magnetic particles 2 | 100.0 | 6,821 |
| Example 32 | Magnetic particles 2 | 100.0 | 7,321 |
| Example 33 | Magnetic particles 2 | 100.0 | 6,925 |
| Example 34 | Magnetic particles 3 | 100.0 | 4,653 |
| Example 35 | Magnetic particles 3 | 100.0 | 5,321 |
| Example 36 | Magnetic particles 3 | 100.0 | 4,823 |
| Example 37 | Magnetic particles 3 | 100.0 | 4,465 |
| Comparative Example 13 | Magnetic particles 1 | 100.0 | 2,304 |
| Comparative Example 14 | Magnetic particles 1 | 100.0 | 2,817 |
| Comparative Example 15 | Magnetic particles 1 | 100.0 | 2,623 |
| Comparative Example 16 | Magnetic particles 1 | 100.0 | 2,765 |
| Comparative Example 17 | Magnetic particles 1 | 100.0 | 3,200 |
| Comparative Example 18 | Magnetic particles 1 | 100.0 | 3,102 |
| Comparative Example 19 | Magnetic particles 1 | 100.0 | 2,804 |
| Comparative Example 20 | Magnetic particles 1 | 100.0 | 2,605 |
| Comparative Example 21 | Magnetic particles 1 | 100.0 | 2,324 |

TABLE 16

| | Properties of magnetic recording medium | | |
|---|---|---|---|
| | Coercive force value | | Squareness |
| Examples | (kA/m) | (Oe) | (—) |
| Example 26 | 76.2 | 958 | 0.89 |
| Example 27 | 76.5 | 961 | 0.90 |
| Example 28 | 76.6 | 963 | 0.91 |
| Example 29 | 76.4 | 960 | 0.91 |
| Example 30 | 150.4 | 1,890 | 0.88 |
| Example 31 | 152.0 | 1,910 | 0.88 |
| Example 32 | 151.6 | 1,905 | 0.88 |
| Example 33 | 145.1 | 1,823 | 0.89 |
| Example 34 | 181.1 | 2,276 | 0.87 |
| Example 35 | 180.7 | 2,271 | 0.87 |
| Example 36 | 179.9 | 2,260 | 0.87 |
| Example 37 | 180.2 | 2,264 | 0.87 |

| | Properties of magnetic recording medium | | |
|---|---|---|---|
| Examples | Gloss (%) | Surface roughness Ra (nm) | Linear absorption ($\mu m^{-1}$) |
| Example 26 | 187 | 7.1 | 2.82 |
| Example 27 | 190 | 6.8 | 2.79 |
| Example 28 | 186 | 7.0 | 2.73 |
| Example 29 | 189 | 7.2 | 2.81 |
| Example 30 | 216 | 6.3 | 2.93 |
| Example 31 | 224 | 5.9 | 3.01 |
| Example 32 | 220 | 6.0 | 3.03 |
| Example 33 | 226 | 6.1 | 2.89 |
| Example 34 | 203 | 7.6 | 2.73 |
| Example 35 | 206 | 7.8 | 2.71 |

TABLE 16-continued

| Example 36 | 201 | 7.8 | 2.76 |
| Example 37 | 204 | 8.1 | 2.83 |

Properties of magnetic recording medium
Durability

| Examples | Running durability time (min) | Head contamination |
|---|---|---|
| Example 26 | ≧30 | A |
| Example 27 | ≧30 | A |
| Example 28 | ≧30 | A |
| Example 29 | ≧30 | A |
| Example 30 | 28.3 | A |
| Example 31 | ≧30 | A |
| Example 32 | 29.8 | A |
| Example 33 | ≧30 | A |
| Example 34 | 27.3 | A |
| Example 35 | 28.1 | B |
| Example 36 | 26.3 | B |
| Example 37 | 25.8 | B |

Properties of magnetic recording medium

| Examples | Drop-out performance (D/O) (number/msec) | Winding non-uniformity (−) | Curling (−) |
|---|---|---|---|
| Example 26 | 5.3 | A | A |
| Example 27 | 5.6 | A | A |
| Example 28 | 5.2 | A | A |
| Example 29 | 5.6 | A | A |
| Example 30 | 4.3 | A | A |
| Example 31 | 4.4 | B | A |
| Example 32 | 4.2 | A | B |
| Example 33 | 4.8 | B | A |
| Example 34 | 4.8 | B | B |
| Example 35 | 4.4 | A | B |
| Example 36 | 9.6 | B | B |
| Example 37 | 8.3 | B | B |

TABLE 17

Properties of magnetic recording medium

| Comparative Examples | Coercive force value (kA/m) | (Oe) | Squareness (−) |
|---|---|---|---|
| Comparative Example 13 | 76.2 | 957 | 0.89 |
| Comparative Example 14 | 76.1 | 956 | 0.90 |
| Comparative Example 15 | 75.6 | 950 | 0.90 |
| Comparative Example 16 | 75.7 | 951 | 0.89 |
| Comparative Example 17 | 75.9 | 954 | 0.89 |
| Comparative Example 18 | 76.2 | 957 | 0.90 |
| Comparative Example 19 | 75.8 | 953 | 0.90 |
| Comparative Example 20 | 76.1 | 956 | 0.90 |
| Comparative Example 21 | 76.0 | 955 | 0.90 |

TABLE 17-continued

Properties of magnetic recording medium

| Comparative Examples | Gloss (%) | Surface roughness Ra (nm) | Linear absorption ($\mu m^{-1}$) |
|---|---|---|---|
| Comparative Example 13 | 184 | 8.4 | 2.36 |
| Comparative Example 14 | 180 | 8.0 | 2.54 |
| Comparative Example 15 | 184 | 8.0 | 2.51 |
| Comparative Example 16 | 186 | 8.1 | 2.49 |
| Comparative Example 17 | 187 | 7.9 | 2.53 |
| Comparative Example 18 | 188 | 8.1 | 2.52 |
| Comparative Example 19 | 183 | 8.3 | 2.45 |
| Comparative Example 20 | 182 | 8.3 | 2.53 |
| Comparative Example 21 | 185 | 7.9 | 2.59 |

Properties of magnetic recording medium
Durability

| Comparative Examples | Running durability time (min) | Head contamination |
|---|---|---|
| Comparative Example 13 | 17.8 | C |
| Comparative Example 14 | 20.6 | C |
| Comparative Example 15 | 21.2 | C |
| Comparative Example 16 | 21.3 | C |
| Comparative Example 17 | 20.9 | C |
| Comparative Example 18 | 20.1 | C |
| Comparative Example 19 | 21.8 | C |
| Comparative Example 20 | 22.3 | C |
| Comparative Example 21 | 20.6 | C |

Properties of magnetic recording medium

| Comparative Examples | Drop-out performance (D/O) (number/msec) | Winding non-uniformity (−) | Curling (−) |
|---|---|---|---|
| Comparative Example 13 | 41.3 | C | C |
| Comparative Example 14 | 19.3 | C | C |
| Comparative Example 15 | 20.2 | C | C |
| Comparative Example 16 | 21.5 | C | C |
| Comparative Example 17 | 19.2 | C | C |
| Comparative Example 18 | 20.1 | C | C |
| Comparative Example 19 | 20.9 | C | C |
| Comparative Example 20 | 19.8 | C | D |
| Comparative Example 21 | 18.6 | C | D |

What is claimed is:

1. A magnetic recording medium comprising:

a non-magnetic base film;

a magnetic recording layer formed on one surface of the non-magnetic base film, comprising a binder resin and magnetic particles; and a back coat layer formed on a surface opposite of the non-magnetic base film to the surface on which the magnetic recording layer is formed, comprising a binder resin and plate-shaped non-magnetic composite particles having an average plate surface diameter of 0.1 to 5.0 µm, an average thickness of 0.001 to 0.1 µm and a plate ratio (average plate surface diameter/average thickness) of 5:1 to 100:1, comprising:

plate-shaped hematite particles as core particles;

a coating layer formed on surface of said plate-shaped hematite particle, comprising at least one organosilicon compound selected from the group consisting of:

(1) organosilane compounds obtained from an alkoxysilane compounds, and (2) polysiloxanes or modified polysiloxanes; and a carbon black coat formed on said coating layer comprising at least one organosilicon compound, in an amount of from more than 1 to 30 parts by weight based on 100 parts by weight of said plate-shaped hematite particles.

2. A magnetic recording medium according to claim 1, wherein said plate-shaped hematite particles as core particles are particles having a coat formed on at least a part of the surface of plate-shaped hematite particles, which coat comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the plate-shaped hematite particles.

3. A magnetic recording medium according to claim 1 or 2, which further comprises a non-magnetic undercoat layer disposed between said non-magnetic base film and said magnetic recording layer.

4. A magnetic recording medium according to claim 1, wherein said modified polysiloxanes are ones selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

5. A magnetic recording medium according to claim 4, wherein said polysiloxanes modified with at least one compound selected from the group consisting of polyethers, polyesters and epoxy compounds are represented by the general formula (III), (IV) or (V):

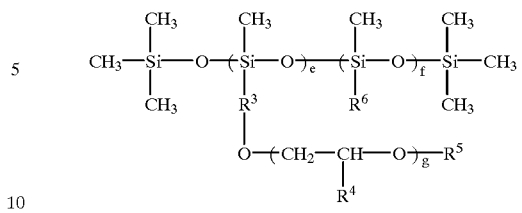

(III)

wherein $R^3$ is $-(-CH_2-)_h-$; $R^4$ is $-(-CH_2-)_i-CH_3$; $R^5$ is $-OH$, $-COOH$, $-CH=CH_2$, $-C(CH_3)=CH_2$ or $-(-CH_2-)_j-CH_3$; $R^6$ is $-(-CH_2-)_k-CH_3$; g and h are an integer of 1 to 15; i, j and k are an integer of 0 to 15; e is an integer of 1 to 50; and f is an integer of 1 to 300;

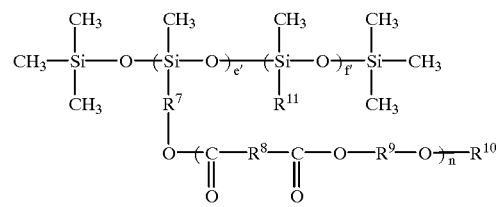

(IV)

wherein $R^7$, $R^8$ and $R^9$ are $-(-CH_2-)_q-$ and may be the same or different; $R^{10}$ is $-OH$, $-COOH$, $-CH=CH_2$, $-C(CH_3)=CH_2$ or $-(-CH_2-)_r-CH_3$; $R^{11}$ is $-(-CH_2-)_s-CH_3$; n and q are an integer of 1 to 15; r and s are an integer of 0 to 15; e' is an integer of 1 to 50; and f' is an integer of 1 to 300; or

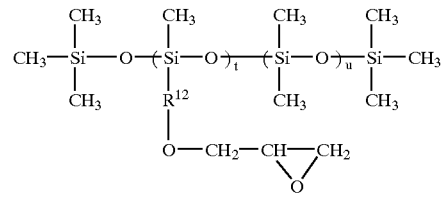

(V)

wherein $R^{12}$ is $-(-CH_2-)_v-$; v is an integer of 1 to 15; t is an integer of 1 to 50; and u is an integer of 1 to 300.

6. A magnetic recording medium according to claim 4, wherein said polysiloxanes whose molecular terminal is modified with at least one group selected from the group consisting of carboxylic acid groups, alcohol groups and a hydroxyl group are represented by the general formula (VI):

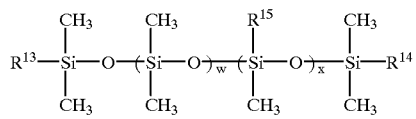

(VI)

wherein $R^{13}$ and $R^{14}$ are $-OH$, $R^{16}OH$ or $R^{17}COOH$ and may be the same or different; $R^{15}$ is $-CH_3$ or $-C_6H_5$; $R^{16}$ and $R^{17}$ are $-(-CH_2-)_y-$; y is an integer of 1 to 15; w is an integer of 1 to 200; and x is an integer of 0 to 100.

7. A magnetic recording medium according to claim 1, wherein said alkoxysilane compound is represented by the general formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

8. A magnetic recording medium according to claim 7, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

9. A magnetic recording medium according to claim 1, wherein said polysiloxanes are represented by the general formula (II):

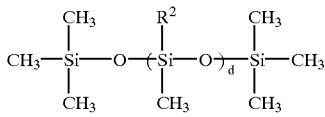

wherein $R^2$ is H— or $CH_3$—, and d is an integer of 15 to 450.

10. A magnetic recording medium according to claim 9, wherein said polysiloxanes are ones having methyl hydrogen siloxane units.

11. A magnetic recording medium according to claim 1, wherein the amount of said organosilicon compound coating is 0.02 to 5.0% by weight, calculated as Si, based on the total weight of the organosilicon compounds and said plate-shaped hematite particles.

12. A magnetic recording medium according to claim 1, wherein the thickness of said carbon black coat is not more than 0.04 μm.

13. A magnetic recording medium according to claim 1, wherein said plate-shaped non-magnetic composite particles have an absorption amount of myristic acid of 0.01 to 0.5 mg/m².

14. A magnetic recording medium according to claim 1, wherein said plate-shaped non-magnetic composite particles have a percentage of desorption of carbon black therefrom of not more than 20%.

15. A magnetic recording medium according to claim 1, wherein said plate-shaped non-magnetic composite particles have a BET specific surface area of 1 to 150 m²/g.

16. A magnetic recording medium according to claim 1, wherein said plate-shaped-non-magnetic composite particles have a geometrical standard deviation value of the average plate surface diameter of not more than 2.5.

17. A magnetic recording medium according to claim 1, wherein said plate-shaped non-magnetic composite particles have a volume resistivity of not more than $5 \times 10^5$ Ω·cm.

18. A magnetic recording medium according to claim 1, wherein said back coat layer has a linear absorption (of the coating film) of 1.8 to 4.0 μm$^{-1}$ and a surface electrical resistivity (of the coating film) of $1.0 \times 10^3$ to $5.0 \times 10^8$ Ω/cm².

19. A magnetic recording medium according to claim 1, which further comprises has a coercive force value of 19.9 to 318.3 kA/m, a squareness (residual magnetic flux density Br/saturation magnetic flux density Bm) of 0.85 to 0.95, a gloss (of the coating film) of 130 to 300%, a surface roughness Ra (of the coating film) of not more than 12.0 nm and a linear absorption (of the coating film) of 1.20 to 5.00 μm$^{-1}$.

20. In a method of forming a magnetic recording medium comprising a non-magnetic base film, a magnetic recording layer comprising a binder resin and magnetic particles, and a back coat layer formed on a surface opposite of the non-magnetic base film to the surface on which the magnetic recording layer is formed, comprising a binder resin and non-magnetic particles, the improvement comprising using as non-magnetic particles plate-shaped non-magnetic composite particles having an average plate surface diameter of 0.1 to 5.0 μm, an average thickness of 0.001 to 0.1 μm and a plate ratio (average plate surface diameter/average thickness) of 5:1 to 100:1, comprising plate-shaped hematite particles as core particles;

a coating layer formed on surface of said plate-shaped hematite particle, comprising at least one organosilicon compound selected from the group consisting of:
(1) organosilane compounds obtained from an alkoxysilane compounds, and
(2) polysiloxanes or modified polysiloxanes; and a carbon black coat formed on said coating layer comprising at least one organosilicon compound, in an amount of from more than 1 to 30 parts by weight based on 100 parts by weight of said plate-shaped hematite particles.

21. The method according to claim 20, wherein said plate-shaped hematite particles as core particles are particles having a coat formed on at least a part of the surface of plate-shaped hematite particles, which coat comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the plate-shaped hematite particles.

* * * * *